United States Patent
Yamada et al.

(10) Patent No.: US 8,052,571 B2
(45) Date of Patent: Nov. 8, 2011

(54) CONTROL DEVICE AND CONTROL METHOD FOR HYBRID VEHICLE

(75) Inventors: Kenji Yamada, Toyota (JP); Takeshi Itoh, Nagoya (JP); Noriaki Ikemoto, Ohbu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 855 days.

(21) Appl. No.: 12/076,184

(22) Filed: Mar. 14, 2008

(65) Prior Publication Data

US 2008/0242463 A1   Oct. 2, 2008

(30) Foreign Application Priority Data

Mar. 30, 2007   (JP) .................... 2007-093128

(51) Int. Cl.
 *H02P 17/00*   (2006.01)
(52) U.S. Cl. ................................................ 477/20
(58) Field of Classification Search ............ None
 See application file for complete search history.

(56) References Cited

U.S. PATENT DOCUMENTS 7,832,510 B2 * 11/2010 Hoshiba et al. .......... 180/65.265
2004/0246637 A1 * 12/2004 Tanaka et al. .................... 361/23

FOREIGN PATENT DOCUMENTS

| JP | A-11-55810 | 2/1999 |
| JP | A-2000-184506 | 6/2000 |
| JP | A 2005-45863 | 2/2005 |
| JP | A 2006-187169 | 7/2006 |
| JP | A-2006-262585 | 9/2006 |

* cited by examiner

*Primary Examiner* — Justin Holmes
(74) *Attorney, Agent, or Firm* — Oliff & Berridge, PLC

(57) ABSTRACT

In a hybrid vehicle that includes an engine and a motor-generator connected to the engine through a power split device, upon acceleration in a running state, there may arise a case where the rotational speed of the MG1 enters a lockup area and, then, the MG1 cannot pull out of the lockup state with ease in such a manner that the rotational speed of the MG1 is shifted from a normal rotation area to a reverse rotation area, in accordance with an increase of a torque produced by the MG1. In this case, the engine is controlled such that a torque produced by the engine is decreased. Thus, the rotational speeds of the engine and MG1 are reduced entirely, so that the MG1 can pull out of the lockup state without increasing the torque produced by the MG1 any more.

10 Claims, 11 Drawing Sheets

FIG.13

| CONTROL MODE | PWM CONTROL MODE | | RECTANGULAR WAVE VOLTAGE CONTROL MODE |
|---|---|---|---|
| | SINE WAVE PWM | OVERMODULATION PWM | RECTANGULAR WAVE (ONE PULSE) |
| WAVEFORM OF VOLTAGE OUTPUTTED FROM INVERTER | BASIC WAVE COMPONENT | BASIC WAVE COMPONENT | BASIC WAVE COMPONENT |
| MODULATION FACTOR | 0~ABOUT 0.61 | ABOUT 0.61~0.78 | 0.78 |
| FEATURES | SMALL VARIATION IN TORQUE | IMPROVED POWER GENERATION IN MIDDLE-SPEED AREA | IMPROVED POWER GENERATION IN HIGH-SPEED AREA |

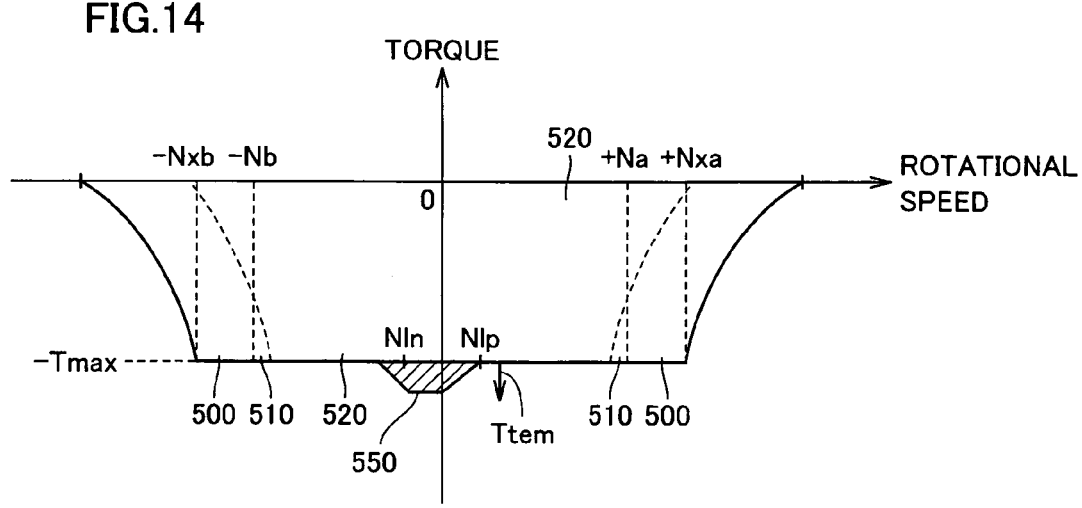

FIG.14

CONTROL DEVICE AND CONTROL METHOD FOR HYBRID VEHICLE

This nonprovisional application is based on Japanese Patent Application No. 2007-093128 filed with the Japan Patent Office on Mar. 30, 2007, the entire contents of which are hereby incorporated by reference.

BACKGROUND OF THE INVENTION

1. Field of the Invention

The present invention relates to a control device and a control method for a hybrid vehicle. More particularly, the present invention relates to a control for a hybrid vehicle including an engine and a motor-generator connected to the engine through a power split device.

2. Description of the Background Art

As one example of hybrid vehicles, there has been proposed a hybrid vehicle including an engine, a power split device, a first motor-generator and a second motor-generator. Herein, the power split device is a planetary gear mechanism in which a carrier is connected to a crank shaft of the engine and a ring gear is connected to a transmitting member coupled to a drive shaft. The first motor-generator is connected to a sun gear of the planetary gear mechanism. The second motor-generator can transmit/receive mechanical power to/from the drive shaft.

For example, Japanese Patent Laying-Open No. 2005-045863 discloses a control method for a hybrid vehicle configured as described above. According to this control method, even when a rotational speed of an electric motor (second motor-generator) or a generator (first motor-generator) is in a lockup area, the motor-generator can pull out of the lockup state promptly, so that a drive circuit of the motor-generator is prevented from being overheated. According to this control method, more specifically, if the motor-generator is in the lockup state, the rotational speed thereof pulls out of the lockup area promptly with the use of a set lockup state pull-out torque. Herein, the lockup state pull-out torque is set larger as a lockup state retention time becomes longer.

Moreover, Japanese Patent Laying-Open No. 2006-187169 discloses another hybrid vehicle configured as described above. In this hybrid vehicle, a first motor-generator and a drive circuit thereof are protected in consideration of restriction on a torque to be required for a drive shaft and restriction on transmission/reception of power to/from an electric storage device. Specifically, a rotational speed of an engine is restricted for restriction on a torque so as to suppress an unexpected torque for a driver from being transmitted to a drive shaft and for restriction on transmission/reception of power to/from an electric storage device. Then, the rotational speed of the engine is further restricted for suppressing a first motor-generator from being driven at a rotational speed of almost zero. Next, a target rotational speed of the engine is set in consideration of theses restrictions on the rotational speed. Thus, the engine and two motor-generators are controlled.

According to the control for pull-out of the lockup state by the control method disclosed in Japanese Patent Laying-Open No. 2005-045863, the lockup state pull-out torque to be set herein is larger than a normal value in order to cause the motor-generator to pull out of the lockup state. However, if the produced torque can not be increased any more with ease, for example, if the torque produced by the first motor-generator already reaches a maximum torque, the motor-generator can not pull out of the lockup state.

For example, in a state where the first motor-generator is operated in a low-speed and regenerating mode and the second motor-generator is operated in a high-speed and power running mode, the hybrid vehicle is further accelerated. As a result, the rotational speed of the first motor-generator shifts from a normal rotation area to a reverse rotation area. Herein, the rotational speed of the first motor-generator passes over 0 rpm in a state where the first motor-generator produces a maximum torque. In other words, the rotational speed of the first motor-generator enters the lockup state (extremely low-speed area). In such a case, however, the control for pull-out of the lockup state disclosed in Japanese Patent Laying-Open No. 2005-045863 fails to cause the first motor-generator to pull out of the lockup state.

Moreover, Japanese Patent Laying-Open No. 2006-187169 discloses a technique for restricting an operating point of the engine, in particular, a rotational speed of the engine so as to avoid occurrence of the lockup state, but does not disclose a technique for causing the motor-generator in the lockup state to pull out of the lockup state promptly.

SUMMARY OF THE INVENTION

An object of the present invention is, in a hybrid vehicle including an engine and a motor-generator connected to the engine through a power split device, to cause the motor-generator to pull out of a lockup state with certainty.

The present invention provides a control device for a hybrid vehicle. The hybrid vehicle includes an engine actuated by combustion of fuel, first and second motor-generators, a power split device, an electric storage device, and a power control unit. The power split device couples a plurality of rotating elements coupled to a transmitting shaft of the engine, a transmitting shaft of the first motor-generator and a transmitting member, respectively, to one another in a relatively rotatable manner, and transmits at least part of power from the engine to the transmitting member by transmission/reception of electrical power and mechanical power to/from the first motor-generator. The second motor-generator supplies mechanical power at a position between the transmitting member and a drive wheel. The power control unit is connected to the electric storage device, the first motor-generator and the second motor-generator to perform bi-directional electrical power control. The control device includes a rotational speed detecting unit, a lockup state detecting unit and a lockup state avoidance controlling unit. The rotational speed detecting unit detects a rotational speed of the first motor-generator. The lockup state detecting unit detects a lockup state of the first motor-generator on the basis of the rotational speed of the first motor-generator. The lockup state avoidance controlling unit decreases a torque produced by the engine upon detection of the lockup state.

The present invention also provides a control method for the hybrid vehicle described above. The control method includes a step of detecting the rotational speed of the first motor-generator, a step of detecting the lockup state of the first motor-generator on the basis of the rotational speed of the first motor-generator, and a step of decreasing the torque produced by the engine upon detection of the lockup state.

According to the control device or the control method for the hybrid vehicle, when the first motor-generator is in the lockup state, the torque produced by the engine is decreased. Thus, it is possible to reduce the rotational speed of the engine and the rotational speed of the first motor-generator. Hence, even when the lockup state occurs in a state where a torque produced by the first motor-generator can not be increased any more with ease, the first motor-generator can pull out of the lockup state.

Preferably, upon detection of the lockup state, the lockup state avoidance controlling unit decreases the torque produced by the engine when a torque produced by the first motor-generator reaches a maximum torque value, and increases the torque produced by the first motor-generator when the torque produced by the first motor-generator has an allowance with respect to the maximum torque value. Alternatively, the control method further includes a step of, in a case where the torque produced by the first motor-generator has an allowance with respect to the maximum torque, increasing the torque produced by the first motor-generator without decreasing the torque produced by the engine.

As described above, when the first motor-generator is in the lockup state, the torque produced by the engine is decreased only in the case where the torque produced by the first motor-generator reaches the maximum torque value. Therefore, the first motor-generator can pull out of the lockup state while preferentially taking fuel efficiency into consideration.

Preferably, the control device further includes a lockup state duration determining unit and a recovery processing unit. The lockup state duration determining unit determines whether the lockup state is still maintained after a lapse of a predetermined time during a period that the lockup state avoidance controlling unit decreases the torque produced by the engine. The recovery processing unit changes the rotational speed of the first motor-generator to a rotational speed before occurrence of the lockup state when the lockup state is still maintained after the lapse of the predetermined time. Alternatively, the control method further includes a step of determining whether the lockup state is still maintained after the lapse of the predetermined time during the period that the torque produced by the engine is decreased in the step of decreasing, and a step of executing a recovery process for changing the rotational speed of the first motor-generator to the rotational speed before occurrence of the lockup state when the lockup state is still maintained after the lapse of the predetermined time.

More preferably, at least one of a first process for relatively increasing the torque produced by the engine and a second process for relatively reducing an absolute value of the torque produced by the first motor-generator, in comparison with the period that the torque produced by the engine is decreased by the lockup state avoidance controlling device or in the step of decreasing, is executed as the recovery process.

As described above, if the first motor-generator can not pull out of the lockup state even when the torque produced by the engine is decreased, the recovery process is executed, that is, the rotational speed of the first motor-generator is changed to the rotational speed before occurrence of the lockup state. Thus, the first motor-generator can pull out of the lockup state with certainty, so that components can be protected.

The present invention also provides another control device for a hybrid vehicle. The hybrid vehicle includes an engine actuated by combustion of fuel, first and second motor-generators, a power split device, an electric storage device, and a power control unit. The power split device couples a plurality of rotating elements, coupled to a transmitting shaft of the engine, a transmitting shaft of the first motor-generator and a transmitting member, respectively, to one another in a relatively rotatable manner, and transmits at least part of power from the engine to the transmitting member by transmission/reception of electrical power and mechanical power to/from the first motor-generator. The second motor-generator supplies mechanical power at a position between the transmitting member and a drive wheel. The power control unit is connected to the electric storage device, the first motor-generator and the second motor-generator to perform bi-directional electrical power control. Further, one of a first control mode in which a feedback control is performed for application of a rectangular wave voltage with a phase corresponding to a torque deviation relative to a torque command value and a second control mode in which a feedback control is performed for application of an AC voltage according to a pulse width modulation control in accordance with a current deviation relative to a current command value corresponding to the torque command value is selectively adapted to each of the first and second motor-generators in accordance with an operating state of corresponding one of the first and second motor-generators. The control device includes a rotational speed detecting unit, a lockup state detecting unit and a torque restriction relaxing unit. The rotational speed detecting unit detects a rotational speed of the first motor-generator. The lockup state detecting unit detects a lockup state of the first motor-generator on the basis of the rotational speed of the first motor-generator. When the lockup state is detected and a torque produced by the first motor-generator reaches a maximum torque value, the torque restriction relaxing unit temporarily relaxes restriction on the torque so as to set the torque produced by the first motor-generator at a value exceeding the maximum torque value.

The present invention also provides another control method for the hybrid vehicle described above. The control method includes a step of detecting the rotational speed of the first motor-generator, a step of detecting the lockup state of the first motor-generator on the basis of the rotational speed of the first motor-generator, and a step of, when the lockup state is detected and the torque produced by the first motor-generator reaches the maximum torque value, temporarily relaxing the restriction on the torque so as to set the torque produced by the first motor-generator at the value exceeding the maximum torque value.

In the control device and the control method, upon production of the maximum torque, the first motor-generator is designed to have both a rotational speed area to which the first control mode is adapted and a rotational speed area to which the second control mode is adapted, and the second control mode is adapted to a low-speed rotation area including the lockup state.

According to the control device or the control method for the hybrid vehicle, a current value of the power control unit at the time when the first motor-generator produces the maximum torque in the second control mode (PWM control mode) has an allowance with respect to a maximum current value of the power control unit at the time when the first motor-generator produces the maximum torque in the first control mode (rectangular wave voltage control mode). When the first motor-generator is in the lockup state, the restriction on the torque produced by the first motor-generator can be relaxed temporarily within a range corresponding to this allowance of the current value. As a result, the torque produced by the first motor-generator is relaxed temporarily in comparison with a rated maximum torque under control; thus, the first motor-generator can pull out of the lockup state promptly.

Preferably, the control device further includes a lockup state duration determining unit and a recovery processing unit. The lockup state duration determining unit determines whether the lockup state is still maintained after a lapse of a predetermined time during a period that the torque restriction relaxing unit temporarily relaxes the restriction on the torque. The recovery processing unit executes at least one of a process for causing the torque restriction relaxing unit to stop the temporal relaxation of the restriction on the torque and a process for changing the rotational speed of the first motor-generator to a rotational speed before occurrence of the lockup state, when the lockup state is still maintained after the lapse of the predetermined time. Alternatively, the control method further includes a step of determining whether the lockup state is still maintained after the lapse of the predetermined time during the period that the restriction on the torque is relaxed temporarily in the step of relaxing and a step of executing at least one of the process for stopping the temporal relaxation of the restriction on the torque in the relaxing step and the process for changing the rotational speed of the first motor-generator to the rotational speed before occurrence of the lockup state, when the lockup state is still maintained after the lapse of the predetermined time.

As described above, if the first motor-generator can not pull out of the lockup state even when the temporal relaxation of the restriction on the torque is maintained for a predetermined period of time, the recovery process is executed, that is, the rotational speed of the first motor-generator is changed to the rotational speed before occurrence of the lockup state. Thus, the first motor-generator can pull out of the lockup state with certainty, so that components can be protected.

Preferably, the lockup state detecting unit detects the lockup state when an absolute value of the rotational speed is not more than a first predetermined rotational speed in a normal rotation area of the first motor-generator, and detects the lockup state when the absolute value of the rotational speed is not more than a second predetermined rotational speed in a reverse rotation area of the first motor-generator. Moreover, the torque restriction relaxing unit relaxes the restriction on the torque such that the produced torque by the first motor-generator has a large absolute value in the reverse rotation area rather than the normal rotation area, relative to the same absolute value of the rotational speed. In the control method, alternatively, the step of detecting lockup state detects lockup state when the absolute value of the rotational speed is not more than the first predetermined rotational speed in the normal rotation area of the first motor-generator, and detecting the lockup state when the absolute value of the rotational speed is not more than the second predetermined rotational speed in the reverse rotation area of the first motor-generator, and the step of relaxing relaxes the restriction on the torque such that the produced torque by the first motor-generator has a large absolute value in the reverse rotation area rather than the normal rotation area, relative to the same absolute value of the rotational speed.

As described above, the first motor-generator can pull out of the lockup state promptly in light of a fact that the lockup state occurs frequently when the first motor-generator shifts from a normal rotation and regenerating mode to a reverse rotation and power running mode.

Preferably, the power split device includes a planetary gear mechanism having, as the plurality of rotating elements, a carrier to which the transmitting shaft of the engine is coupled, a ring gear to which the transmitting member is coupled, and a sun gear to which the transmitting shaft of the first motor-generator is coupled.

As described above, according to the present invention, in the hybrid vehicle including the engine and the motor-generator connected to the engine through the power split device, the motor-generator can pull out of the lockup state with certainty.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 schematically illustrates a control mode in each motor-generator.

FIG. 14 shows a negative torque area in FIG. 4 in an enlarged manner.

DESCRIPTION OF THE PREFERRED EMBODIMENTS

Figure 1:
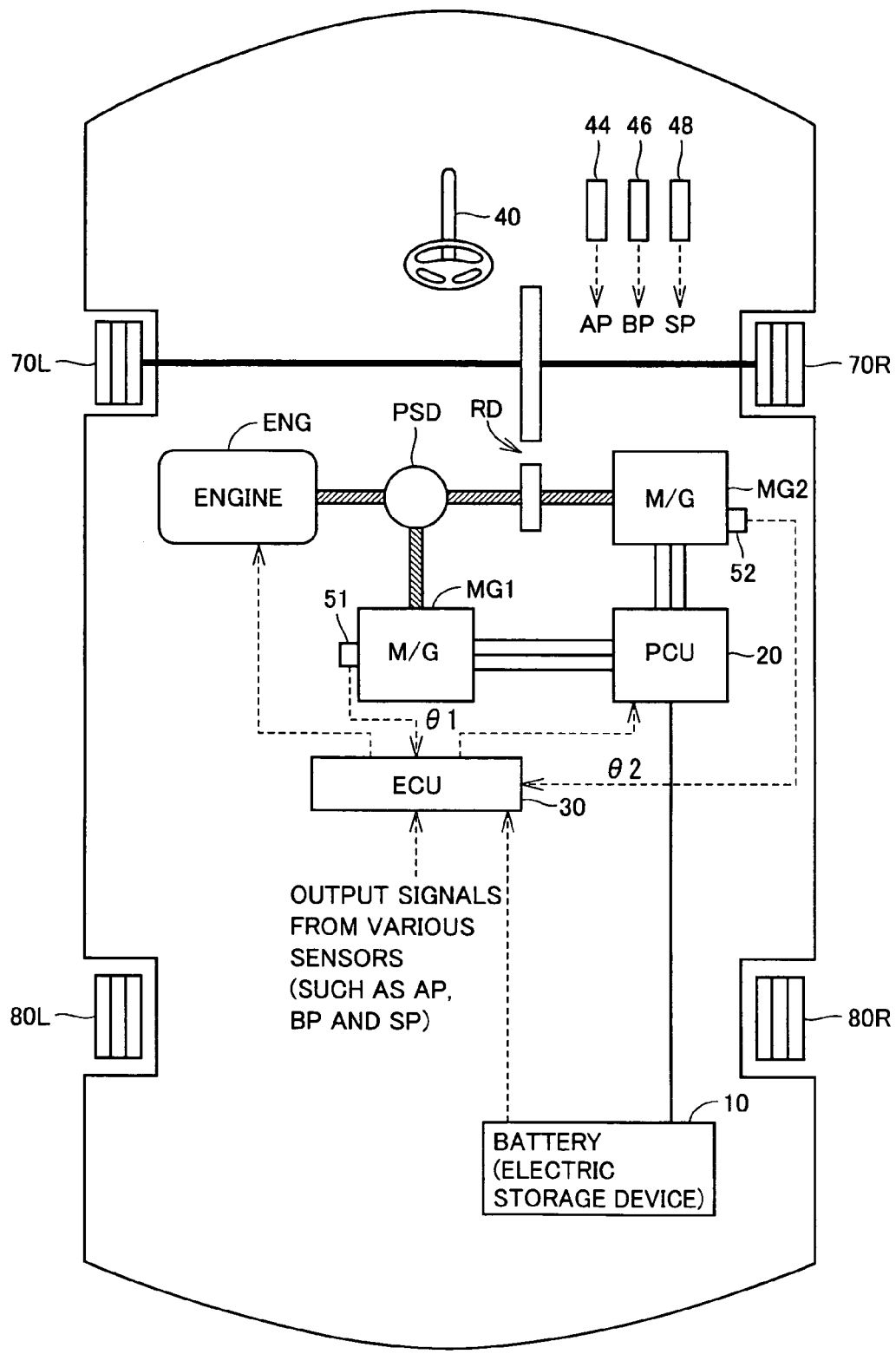
FIG. 1 is a schematic block diagram showing a general configuration of a hybrid vehicle including a control device according to the present invention.

With reference to the drawings, hereinafter, detailed description will be given of preferred embodiments of the present invention. In the drawings, identical or corresponding portions are denoted by identical reference characters; therefore, repetitive description thereof will not be given in principle.

(Configuration of Hybrid Vehicle)

FIG. 1 is a schematic block diagram showing a general configuration of a hybrid vehicle including a control device according to the present invention.

With reference to FIG. 1, hybrid vehicle 5 includes an engine ENG, motor-generators MG1 and MG2, a battery 10, a power control unit (PCU) 20, a power split device PSD, a speed reducer RD, front wheels 70L and 70R, rear wheels 80L and 80R, and an electrical control unit (ECU) 30. The control device and the control method according to the present invention is realized by a program executed by ECU 30, for example. In FIG. 1, as one example, front wheels 70L and 70R of hybrid vehicle 5 are drive wheels. Alternatively, rear wheels 80L and 80R may be drive wheels in place of front wheels 70L and 70R. Still alternatively, a motor-generator for driving rear wheels 80L and 80R may be provided in addition to the configuration shown in FIG. 1 such that hybrid vehicle 5 becomes a 4WD vehicle.

Power split device PSD splits a driving force generated by engine ENG into two paths. One of the paths is used for driving front wheels 70L and 70R through speed reducer RD. The other one of the paths is used for driving motor-generator MG1 to cause motor-generator MG1 to generate electrical power.

Motor-generator MG1 is typically a three-phase AC synchronous generator. Motor-generator MG1 serves as a generator to generate electrical power from a driving force which is generated by engine ENG and is split by power split device PSD. Motor-generator MG1 functions as not only a generator, but also an actuator for controlling a rotational speed of engine ENG.

Herein, the electrical power generated by motor-generator MG1 is appropriately used in accordance with a running state of hybrid vehicle 5 or a state-of-charge (SOC) of battery 10. On a normal run or under abrupt acceleration, for example, the electrical power generated by motor-generator MG1 is used for driving motor-generator MG2 such that motor-generator MG2 acts as an electric motor. On the other hand, if the SOC of battery 10 is lower than a predetermined value, the electrical power generated by motor-generator MG1 is converted from AC power to DC power by PCU 20, and then the DC power is stored in battery 10.

Motor-generator MG1 also serves as a starter for starting up engine ENG. In order to start up engine ENG, motor-generator MG1 receives electrical power from battery 10 to act as an electric motor. Then, motor-generator MG1 cranks up engine ENG.

Motor-generator MG2 is typically a three-phase AC synchronous generator. Motor-generator MG2 serving as an electric motor is driven by at least one of the electrical power stored in battery 10 and the electrical power generated by motor-generator MG1. A driving force from motor-generator MG2 is transferred to front wheels 70L and 70R through speed reducer RD. Thus, motor-generator MG2 assists engine ENG to cause hybrid vehicle 5 to run. Alternatively, hybrid vehicle 5 runs with the use of only the driving force from motor-generator MG2.

At the time of regenerative braking of hybrid vehicle 5, motor-generator MG2 is driven by front wheels 70L and 70R through speed reducer RD so as to act as a generator. Thus, motor-generator MG2 acts as a regenerative brake for converting braking energy to electrical energy. The electrical power generated by motor-generator MG2 is stored in battery 10 through PCU 20.

Battery 10 is, for example, a secondary battery made of nickel hydride or lithium ion. In this embodiment of the present invention, battery 10 is a typical example of "an electric storage device". That is, an electric storage device such as an electrical double layer capacitor may be used as an alternative of battery 10. Battery 10 supplies a DC voltage to PCU 20, and is charged by a DC voltage from PCU 20.

PCU 20 performs bi-directional electrical power conversion between DC power supplied by battery 10 and one of AC power for control of the electric motor and AC power generated by the generator.

Hybrid vehicle 5 also includes a steering wheel 40, an accelerator position sensor 44 for detecting an accelerator pedal position AP, a brake pedal position sensor 46 for detecting a brake pedal position BP, and a shift position sensor 48 for detecting a shift position SP.

Moreover, motor-generators MG1 and MG2 are provided with rotation angle sensors 51 and 52 for detecting a rotor rotation angle, respectively. ECU 30 receives a rotor rotation angle $\theta 1$ of motor-generator MG1 detected by rotation angle sensor 51 and a rotor rotation angle $\theta 2$ of motor-generator MG2 detected by rotation angle sensor 52. Herein, if ECU 30 estimates rotor rotation angle $\theta 1$ from a current, a voltage and the like of motor-generator MG1 and estimates rotor rotation angle $\theta 2$ from a current, a voltage and the like of motor-generator MG2, rotation angle sensors 51 and 52 may not be provided in motor-generators MG1 and MG2, respectively.

ECU 30 is electrically connected to engine ENG, PCU 20 and battery 10. On the basis of detection signals from the various sensors, ECU 30 controls a running state of engine ENG, driving states of motor-generators MG1 and MG2, and a SOC of battery 10 in an integrated manner such that a running state of hybrid vehicle 5 becomes desirable.

Figure 2:
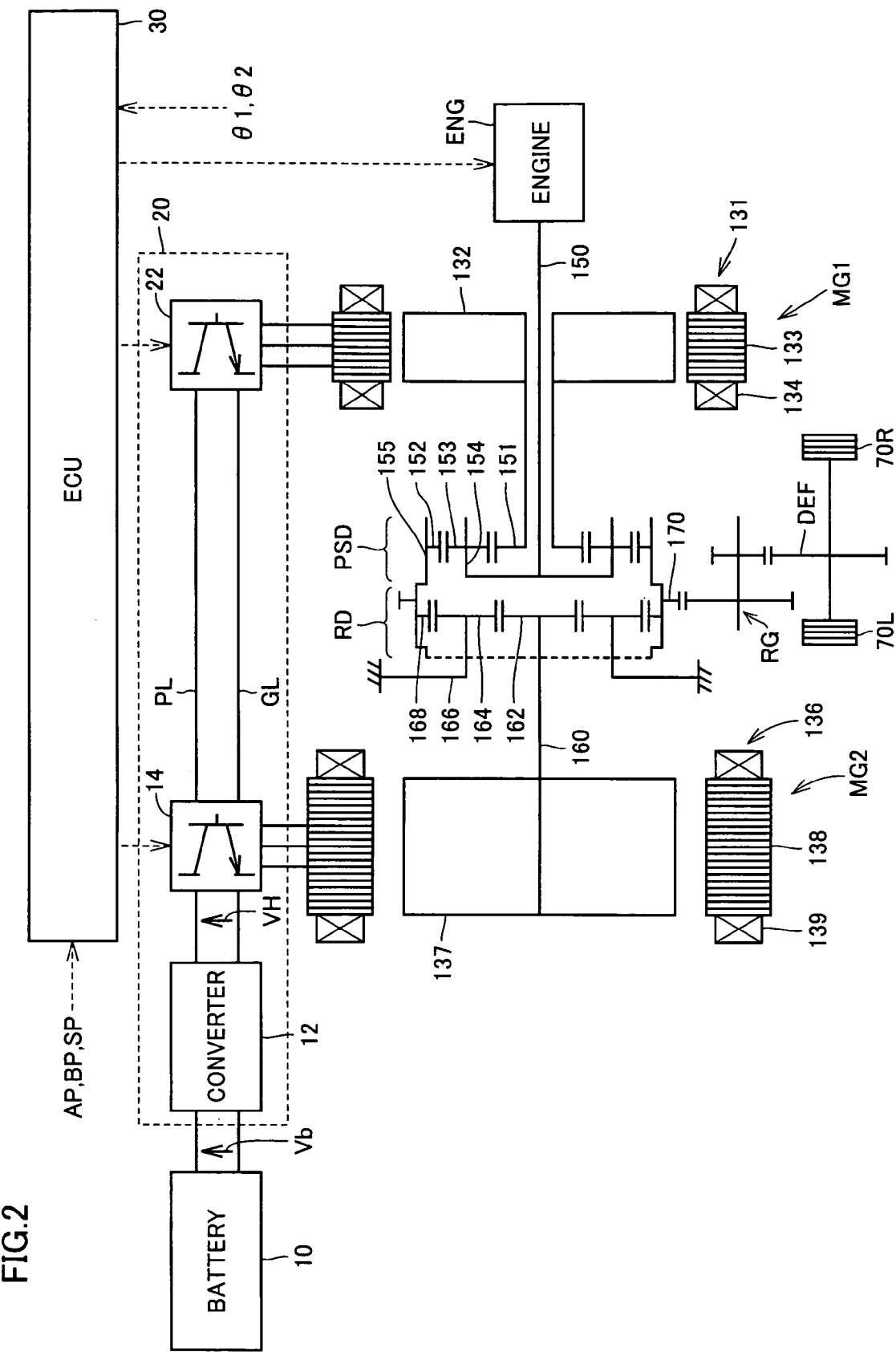
FIG. 2 is a schematic diagram showing details of a power train in the hybrid vehicle shown in FIG. 1.

FIG. 2 is a schematic diagram illustrating details of a power train in hybrid vehicle 5 shown in FIG. 1.

With reference to FIG. 2, the power train (hybrid system) in hybrid vehicle 5 includes motor-generator MG2, speed reducer RD connected to a transmitting shaft 160 of motor-generator MG2, engine ENG, motor-generator MG1, and power split device PSD.

Power split device PSD is a planetary gear mechanism in the example shown in FIG. 2. Power split device PSD includes a sun gear 151, a ring gear 152, a pinion gear 153 and a planetary carrier 154. Sun gear 151 is coupled to a hollow sun gear shaft having an axial center through which a crank shaft 150 is inserted. Ring gear 152 is supported rotatably so as to be coaxially with crank shaft 150. Pinion gear 153 is disposed between sun gear 151 and ring gear 152, and orbits around a perimeter of sun gear 151 while rotating. Planetary carrier 154 is coupled to an end of crank shaft 150 to support a rotation shaft of pinion gear 153.

Power split device PSD has, as a power transmitting/receiving shaft, three shafts: the sun gear shaft coupled to sun gear 151, a ring gear case 155 coupled to ring gear 152 and crank shaft 150 coupled to planetary carrier 154. When mechanical power to be transmitted to/received from two of these three shafts is determined, mechanical power to be transmitted to/received from the remaining one shaft is determined on the basis of the former mechanical power.

A counter drive gear 170 for extraction of mechanical power is provided outside ring gear case 155 to rotate integrally with ring gear 152. Counter drive gear 170 is connected to a power transfer and reduction gear RG. Ring gear case 155 corresponds to "a transmitting member" according to the present invention. Thus, power split device PSD transmits at least part of output power from engine ENG to the transmitting member by transmission/reception of electric power and mechanical power to/from motor-generator MG1.

Further, mechanical power is transferred between counter drive gear 170 and power transfer and reduction gear RG. Then, power transfer and reduction gear RG drives a differential gear DEF connected to front wheels 70L and 70R each serving as a drive wheel. In a downhill slope and the like, a torque of the drive wheel is transferred to differential gear DEF, so that power transfer and reduction gear RG is driven by differential gear DEF.

Motor-generator MG1 includes a stator 131 and a rotor 132. Stator 131 forms a rotating magnetic field. Rotor 132 is disposed inside stator 131 and has a plurality of permanent magnets embedded therein. Stator 131 includes a stator core 133 and a three-phase coil 134 wound around stator core 133.

Rotor 132 is coupled to the sun gear shaft rotating integrally with sun gear 151 of power split device PSD. Stator core 133 is formed by lamination of magnetic thin steel plates, and is fixed to a casing (not shown).

Motor-generator MG1 serves as an electric motor for rotationally driving rotor 132, by interaction between a magnetic field generated by a permanent magnet embedded in rotor 132 and a magnetic field formed by three-phase coil 134. Motor-generator MG1 also serves as a generator for generating an electromotive force at both ends of each three-phase coil 134, by the interaction between the magnetic field generated by the permanent magnet and a torque of rotor 132.

Motor-generator MG2 includes a stator 136 and a rotor 137. Stator 136 forms a rotating magnetic field. Rotor 137 is disposed inside stator 136 and has a plurality of permanent magnets embedded therein. Stator 136 includes a stator core 138 and a three-phase coil 139 wound around stator core 138.

Rotor 137 is coupled to ring gear case 155 rotating integrally with ring gear 152 of power split device PSD, through speed reducer RD. Stator core 138 is formed by lamination of magnetic thin steel plates, and is fixed to the casing (not shown), for example.

Motor-generator MG2 serves as a generator for generating an electromotive force at both ends of each three-phase coil 139, by the interaction between the magnetic field generated by the permanent magnet and a torque of rotor 137. Motor-generator MG2 also serves as an electric motor for rotationally driving rotor 137, by interaction between the magnetic field generated by the permanent magnet and a magnetic field formed by three-phase coil 139.

Speed reducer RD reduces a speed by a structure that a planetary carrier 166, which is one of rotating elements of a planetary gear, is fixed to the casing. That is, speed reducer RD includes a sun gear 162, a ring gear 168 and a pinion gear 164. Sun gear 162 is coupled to transmitting shaft 160 of rotor 137. Ring gear 168 rotates integrally with ring gear 152. Pinion gear 164 is engaged with ring gear 168 and sun gear 162 to transfer a torque of sun gear 162 to ring gear 168. For example, teeth of ring gear 168, which are twice in number as large as those of sun gear 162, make a reduction ratio not less than twice.

As described above, a torque of motor-generator MG2 is transferred to transmitting member (ring gear case) 155, which rotates integrally with ring gears 152 and 168, through speed reducer RD. In other words, motor-generator MG2 supplies mechanical power at a position between transmitting member 155 and the drive wheel. Herein, transmitting shaft 160 of motor-generator MG2 and transmitting member 155 may be coupled to each other without providing speed reducer RD, that is, without setting the reduction gear ratio.

PCU 20 includes a converter 12, and inverters 14 and 22. Converter 12 converts a DC voltage Vb from battery 10 to a DC voltage VH, and then outputs DC voltage VH between a power supply line PL and a grounding line GL. Moreover, converter 12 can perform bidirectional voltage conversion, that is, can convert DC voltage VH between power supply line PL and grounding line GL to charging voltage Vb of battery 10.

As will be described later, each of inverters 14 and 22 is a typical three-phase inverter. Inverter 14 converts DC voltage VH between power supply line PL and grounding line GL to an AC voltage, and then outputs the AC voltage to motor-generator MG2. Inverter 22 converts DC voltage VH between power supply line PL and grounding line GL to an AC voltage, and then outputs the AC voltage to motor-generator MG1. Moreover, inverter 14 converts an AC voltage generated by motor-generator MG2 to a DC voltage VH, and then outputs DC voltage VH between power supply line PL and grounding line GL. Inverter 22 converts an AC voltage generated by motor-generator MG1 to a DC voltage VH, and then outputs DC voltage VH between power supply line PL and grounding line GL.

First Embodiment

Figure 3:
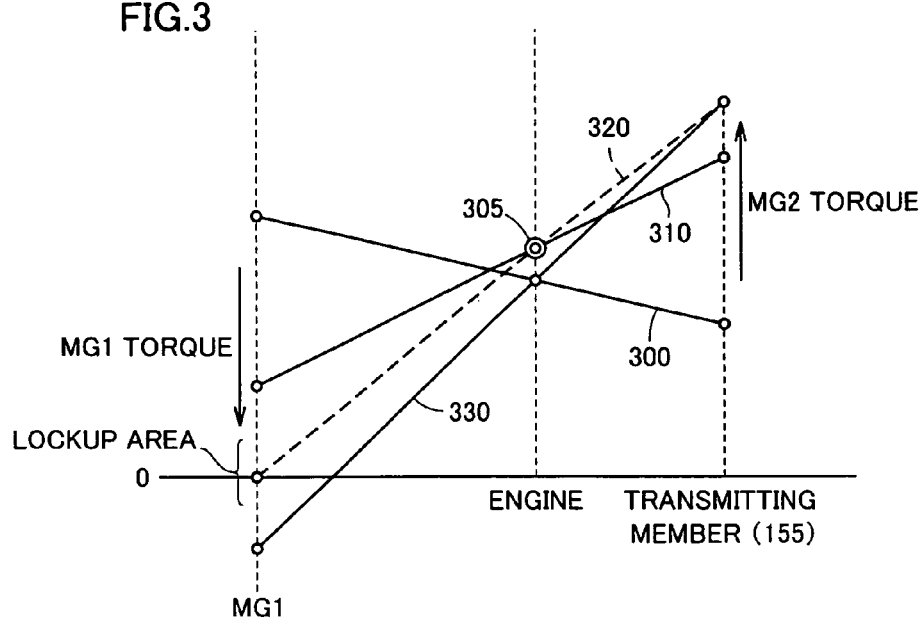
FIG. 3 is an alignment chart illustrating a behavior of a rotational speed upon occurrence of a lockup state.

In the hybrid vehicle configured as described above, a rotational speed of motor-generator MG1, a rotational speed of engine ENG and a rotational speed of transmitting member (ring gear case) 155 are changed by a differential operation performed by power split device PSD such that a difference in rotational speed between transmitting member 155 and either motor-generator MG1 or engine ENG is maintained at a certain ratio as shown in an alignment chart of FIG. 3.

FIG. 3 is an alignment chart illustrating a behavior of a rotational speed upon occurrence of a lockup state.

With reference to FIG. 3, in normal running, the rotational speed of motor-generator MG1 (hereinafter, simply referred to as the "MG1 rotational speed") is controlled with respect to the rotational speed of transmitting member 155 determined in correspondence with a vehicle speed such that the rotational speed of the engine falls within a range where fuel efficiency is excellent.

In a state shown by a line 300 in FIG. 3, more specifically, when a vehicle requested driving force is increased in such a manner that a driver presses an acceleration pedal, the rotational speed of transmitting member 155 is increased by a torque produced by motor-generator MG1 and a torque produced by motor-generator MG2. As shown by a line 310 in FIG. 3, thus, in the hybrid vehicle, motor-generator MG1 is operated in a low speed and regenerating mode and motor-generator MG2 is operated in a high speed and power running mode. As a result, the rotational speed of the engine is set at a point 305 which is suitable in terms of fuel efficiency. Herein, motor-generator MG1 produces the torque in a direction for suppression of an increase of the MG1 rotational speed to generate electrical power. In this state, basically, electrical power balance control is performed such that electrical power generated by motor-generator MG1 becomes equal to electrical power consumed by motor-generator MG2.

It is assumed herein that the driver requests further acceleration in this state. As shown by a line 320 in FIG. 3, then, the rotational speed of the engine is maintained and the torque produced by motor-generator MG1 is increased in order to keep fuel efficiency at a favorable level. Thus, a torque to be transferred to transmitting member 155 is increased, so that the rotational speed is increased. Then, the torque produced by motor-generator MG1 is further increased in a direction that the MG1 rotational speed is reduced. Consequently, the MG1 rotational speed enters a lockup area (extremely low speed area) in some cases. Herein, motor-generator MG2 is operated while the torque produced thereby is decreased. That is, the electrical power balance control is performed.

In the lockup state, a current continuously flows in a specific phase of motor-generator MG1. Consequently, there is a possibility that components are damaged due to heat generated from the coil of motor-generator MG1 and a switching element (IGBT) of a specific phase of inverter 22. Accordingly, motor-generator MG1 must pull out of this lockup state promptly.

Ideally, the rotational speed of transmitting member 155 is further increased while the rotational speed of the engine is maintained in the state shown by line 320 in FIG. 3. Further, the MG1 rotational speed is shifted from a normal rotation area to a reverse rotation area. Thus, motor-generator MG1 pulls out of the lockup state desirably.

Figure 4:
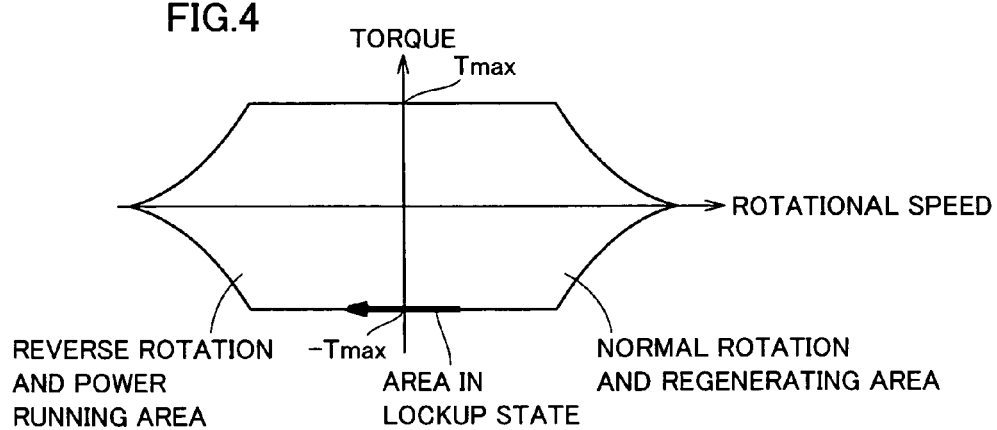
FIG. 4 is a conceptual diagram illustrating an operating area of a motor-generator (MG1).

With reference to FIG. 4, motor-generator MG1 is operated at four quadrants by combinations of a normal rotational speed, a reverse rotational speed, a positive torque and a negative torque. Herein, on the basis of a rated torque of the motor-generator or the inverter, the produced torque is set within a range up to a maximum torque Tmax (upon production of positive torque) or −Tmax (upon production of negative torque) in an area where an absolute value of a rotational speed is within a predetermined value (low- or middle-speed rotation area). In a high-speed rotation area, on the other hand, the produced torque does not reach the maximum torque Tmax or −Tmax due to an increase of an induced voltage from motor-generator MG1; therefore, the produced torque is further restricted.

Figure 5:
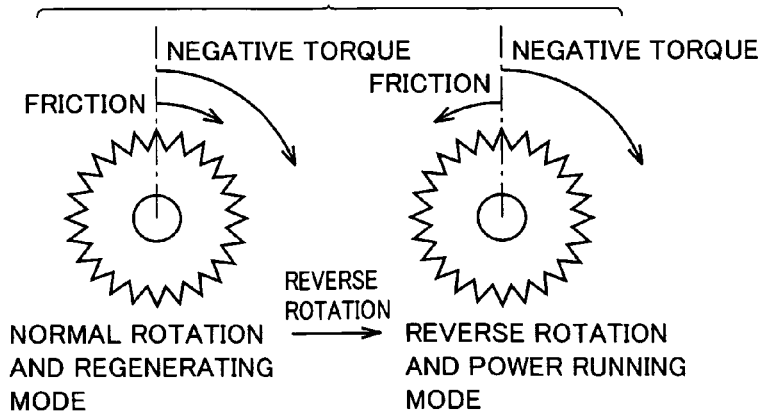
FIG. 5 is a conceptual diagram illustrating a relation between a torque produced by the motor-generator and a direction of generation of a frictional force in a lockup area.

That is, in order to pull out of the lockup state shown by line 320 in FIG. 3, motor-generator MG1 must be shifted from a normal rotation and regenerating area to a reverse rotation and power running area. As shown in FIG. 5, however, a direction of a mechanical friction (inertia) of a gear or the like is inverted in such a shift. Consequently, even when the torque (negative) produced by motor-generator MG1 reaches maximum torque −Tmax, the MG1 rotational speed can not be shifted to the reverse rotation area satisfactorily. As a result, the lockup state is disadvantageously maintained in some cases.

Figure 6:
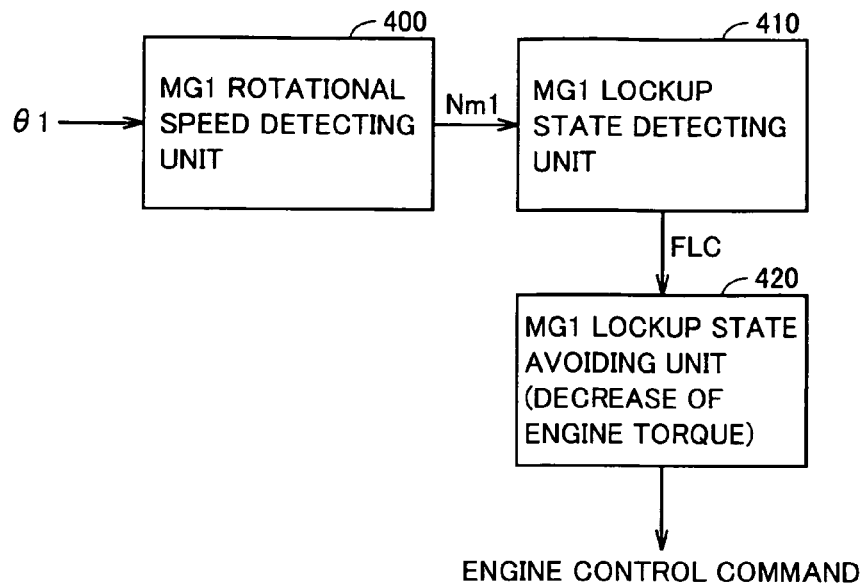
FIG. 6 is a schematic block diagram illustrating a control for pull-out of the lockup state in a first embodiment of the present invention.

FIG. 6 is a schematic block diagram illustrating a control for pull-out of the lockup state in the first embodiment of the present invention.

With reference to FIG. 6, an MG1 rotational speed detecting unit 400 detects an MG1 rotational speed Nm1 (rpm) on the basis of rotor rotation angle θ1 detected or estimated by rotational speed sensor 51 of motor-generator MG1.

On the basis of detected MG1 rotational speed Nm1, an MG1 lockup state detecting unit 410 detects whether the lockup state occurs at motor-generator MG1. At the time of occurrence of the lockup state, then, MG1 lockup state detecting unit 410 sets a lockup state determination flag FLC.

The detection of the lockup state by MG1 lockup state detecting unit 410 is determined whether MG1 rotational speed Nm1 falls within a range of an extremely low rotational speed area (Nln≦Nm1≦Nlp) including a case where MG1 rotational speed Nm1 is equal to zero. Herein, "Nlp" denotes a lockup state determination value in the normal rotation area (i.e., Nlp>0), and "Nln" denotes a lockup state determination value in the reverse rotation area (i.e., Nln<0).

Preferably, lockup state determination value Nlm or Nlp is set so as to have a large absolute value in comparison with an actual lockup area in consideration of a time required for data computation or data transfer of the MG1 rotational speed or an influence of control responsiveness for avoidance of the lockup state (to be described later).

When MG1 lockup state detecting unit 410 sets lockup state determination flag FLC, an MG1 lockup state avoiding unit 420 issues an engine control command so as to decrease the torque produced by engine ENG.

Figure 7:
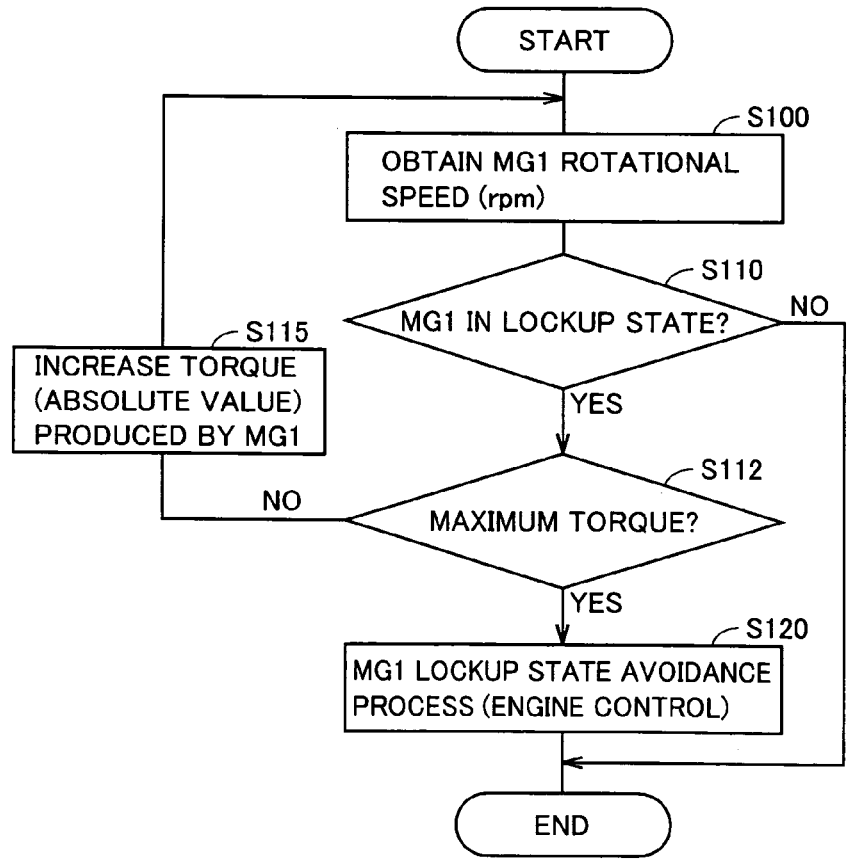
FIG. 7 is a flowchart realizing the control for pull-out of the lockup state in the first embodiment of the present invention.

FIG. 7 is a flowchart realizing the control for pull-out of the lockup state in the first embodiment of the present invention, with the use of ECU 30.

With reference to FIG. 7, in step S100, ECU 30 obtains an MG1 rotational speed. That is, the process in step S100 corresponds to the function of MG1 rotational speed detecting unit 400 in FIG. 6.

In step S110, next, ECU 30 determines whether the lockup state occurs at motor-generator MG1. That is, the process in step S110 corresponds to the function of MG1 lockup state detecting unit 410 in FIG. 6.

If the lockup state occurs (YES in step S110), the program proceeds to step S112. In step S112, ECU 30 determines whether a torque T1 produced by motor-generator MG1 reaches maximum torque −Tmax (FIG. 4). If torque T1 does not reach the maximum torque, that is, if a relation of |T1|<|−Tmax| is established (NO in step S112, the program proceeds to step S115. In step S115, ECU 30 increases the torque (absolute value) produced by motor-generator MG1.

On the other hand, if torque T1 produced by motor-generator MG1 reaches maximum torque −Tmax (FIG. 4) (YES in step S112), the program proceeds to step S120. In step S120, ECU 30 executes an MG1 lockup state avoidance process by engine control. More specifically, ECU 30 issues an engine control command for decreasing the torque produced by the engine to reduce the rotational speed of the engine. In the state shown by line 320 in FIG. 3, the engine rotational speed and the MG1 rotational speed are reduced integrally. As a result, motor-generator MG1 can pull out of the lockup state in the reverse rotation area without increasing the torque (absolute value) as shown by a line 330 in FIG. 3. That is, the process in step S120 corresponds to the operation of MG1 lockup state avoiding unit 420 in FIG. 6.

Figure 8:
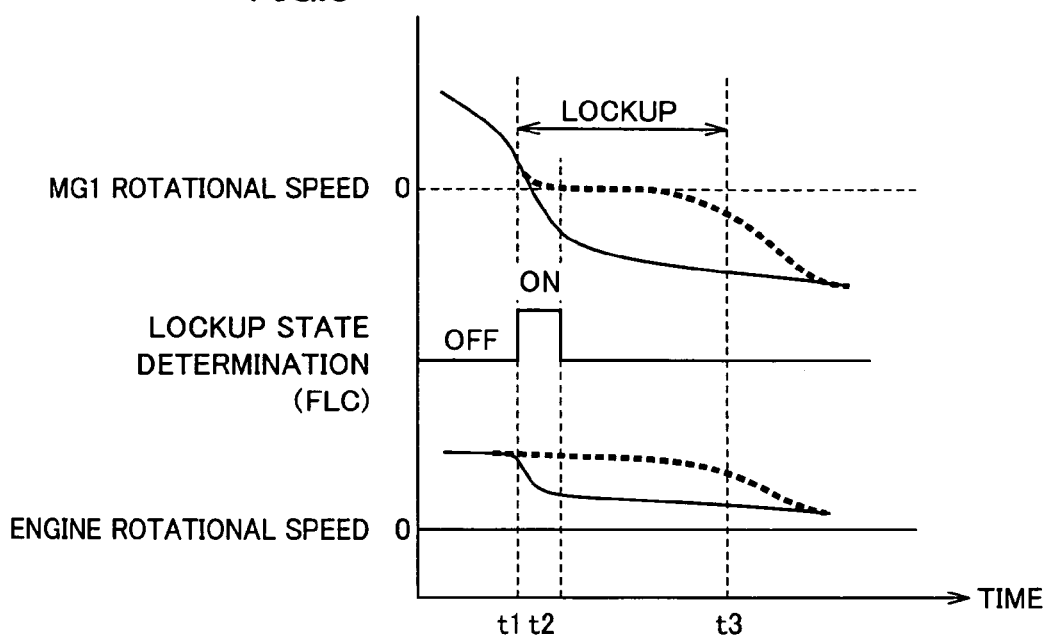
FIG. 8 is an operational waveform chart at the time of the control for pull-out of the lockup state in the first embodiment of the present invention.

With reference to FIG. 8, at a time t1, when the MG1 rotational speed enters the lockup area, lockup state determination flag FLC is set. As in step S120 shown in FIG. 7, herein, the engine control is performed so as to decrease the torque produced by the engine, so that the engine rotational speed is reduced. As a result, the MG1 rotational speed is also reduced together with the reduction of the engine rotational speed. Thus, the shift from line 320 to line 330 is realized in FIG. 3.

As a result, at a time t2, motor-generator MG1 can pull out of the lockup state promptly. Thus, lockup state determination flag FLC is cleared again; therefore, the engine control for decreasing the torque produced by the engine ends. As a result, a current can be avoided from continuously flowing into the specific phase of motor-generator MG1, and the components can be prevented from being damaged due to the heat generated by the coil of motor-generator MG1 and the heat generated by the switching element of the specific phase of inverter 22.

As shown by a dotted line in FIG. 8, in contrast, failure of the control for pull-out of the lockup state caused due to the decrease of the torque produced by the engine causes continuous occurrence of the state shown by line 320 (FIG. 3), so that the lockup state occurs for a relatively long period of time (time t1 to time t3).

As described above, at the time of occurrence of the lockup state at motor-generator MG1, the control device according to the first embodiment decreases the torque produced by the engine and reduces the MG1 rotational speed integrally with the engine rotational speed, so that motor-generator MG1 can pull out of the lockup state. As a result, even when the torque produced by motor-generator MG1 reaches the maximum torque at the time of occurrence of the lockup state, motor-generator MG1 can pull out of the lockup state promptly.

At the time of occurrence of the lockup state, further, the control device determines whether the torque produced by motor-generator MG1 reaches the maximum torque, and changes (reduces) the rotational speed of the engine only in the case where the torque produced by motor-generator MG1 reaches the maximum torque. Thus, the control device suppresses a change in operations of the engine as much as possible, thereby performing the control for pull-out of the lockup state while preferentially taking fuel efficiency of the engine into consideration.

(Modification of First Embodiment)

In a modification of the first embodiment, description will be given of a control for pull-out of the lockup state with certainty in a case where the lockup state is still maintained after a lapse of a predetermined time even when the control for pull-out of the lockup state in the first embodiment is performed.

Figure 9:
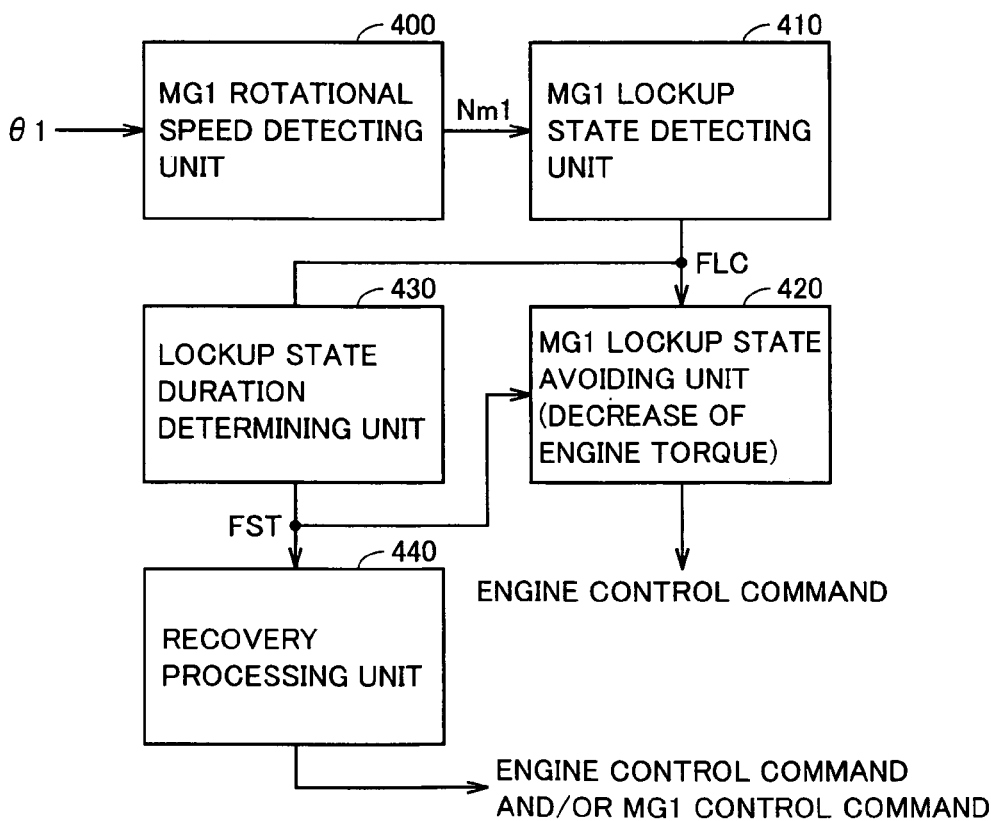
FIG. 9 is a schematic block diagram illustrating a control for pull-out of the lockup state in a modification of the first embodiment of the present invention.

FIG. 9 is a schematic block diagram illustrating the control for pull-out of the lockup state in the modification of the first embodiment of the present invention.

With reference to FIG. 9, the control for pull-out of the lockup state in the modification of the first embodiment is different from the control for pull-out of the lockup state in the first embodiment shown in FIG. 6. Specifically, a lockup state duration determining unit 430 and a recovery processing unit 440 are further provided in the modification of the first embodiment.

On the basis of lockup state determination flag FLC, lockup state duration determining unit 430 detects a duration of the lockup state, and sets a flag FST when the lockup state duration exceeds a predetermined time. When flag FST is set, MG1 lockup state avoiding unit 420 stops generation of the engine control command for decreasing the torque produced by the engine.

In response to the fact that flag FST is set, further, recovery processing unit 440 generates an engine control command and/or an MG1 control command for changing the rotational speed of motor-generator MG1 to a rotational speed before occurrence of the lockup state.

Figure 10:
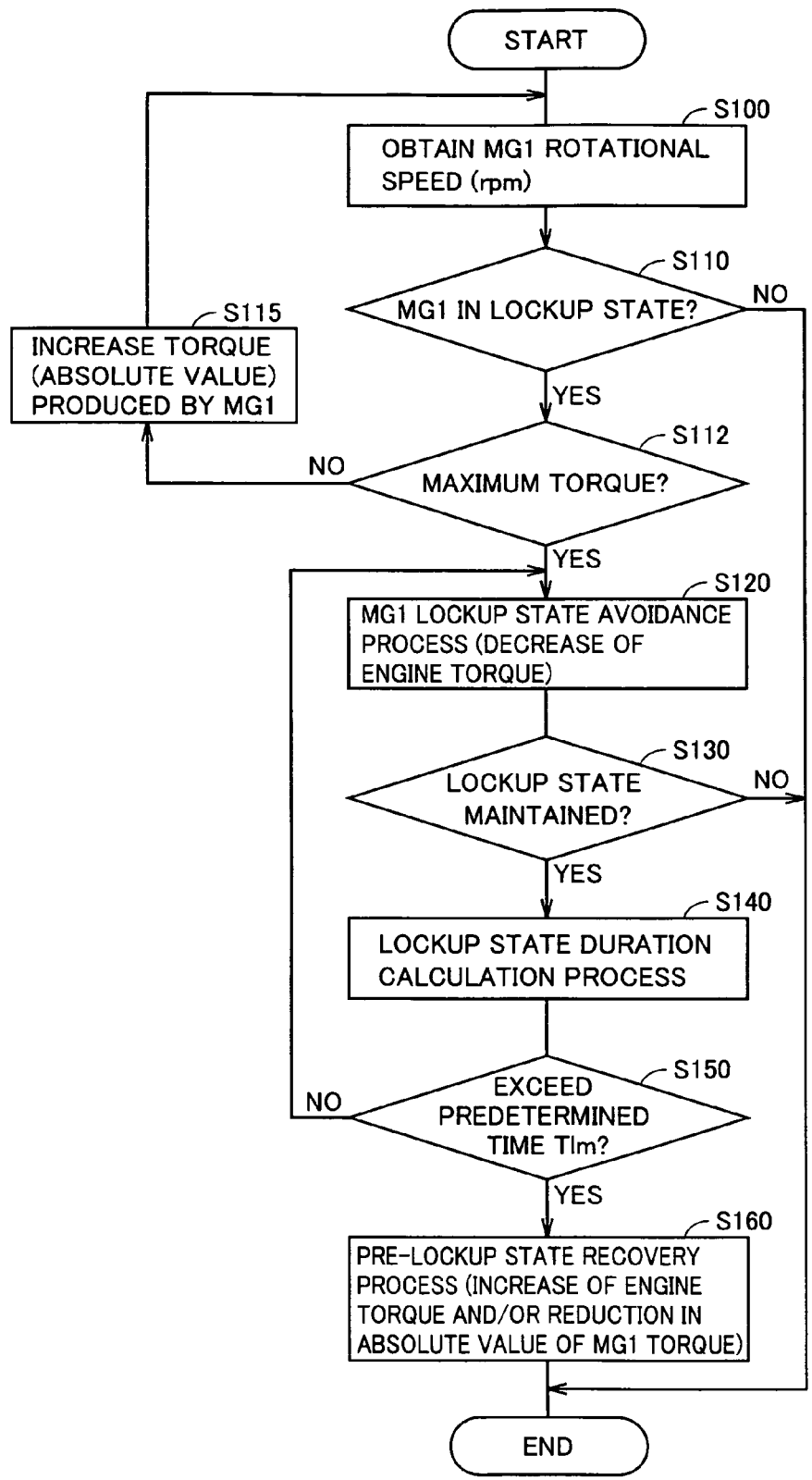
FIG. 10 is a flowchart realizing the control for pull-out of the lockup state in the modification of the first embodiment of the present invention.

FIG. 10 is a flowchart realizing the control for pull-out of the lockup state in the modification of the first embodiment shown in FIG. 9, with the use of ECU 30.

With reference to FIG. 10, ECU 30 performs the control for pull-out of the lockup state, which is similar to the control in the first embodiment, in steps S100 to S120. In step S120, ECU 30 executes the MG1 lockup state avoidance process accompanying the decrease of the torque produced by the engine. In step S130, then, ECU 30 determines whether lockup state is still maintained. In step S140, further, ECU 30 calculates a lockup state duration which is a time elapsed from the start of the lockup state avoidance process in step S120.

In step S150, then, ECU 30 determines whether the lockup state duration calculated in step S140 exceeds predetermined time Tlm. That is, the processes in steps S130 to S150 correspond to the function of lockup state duration determining unit 430 in FIG. 9.

If the lockup state is still maintained even when the lockup state duration exceeds predetermined time Tlm (YES in step S150), the program proceeds to step S160. In step S160, ECU 30 executes a pre-lockup state recovery process. That is, the process in step S160 corresponds to the function of recovery processing unit 440 in FIG. 9.

On the other hand, if the lockup state duration is not more than predetermined time Tlm (NO in step S150), ECU 30 executes the processes in steps S120 to S150 repeatedly.

Figure 11:
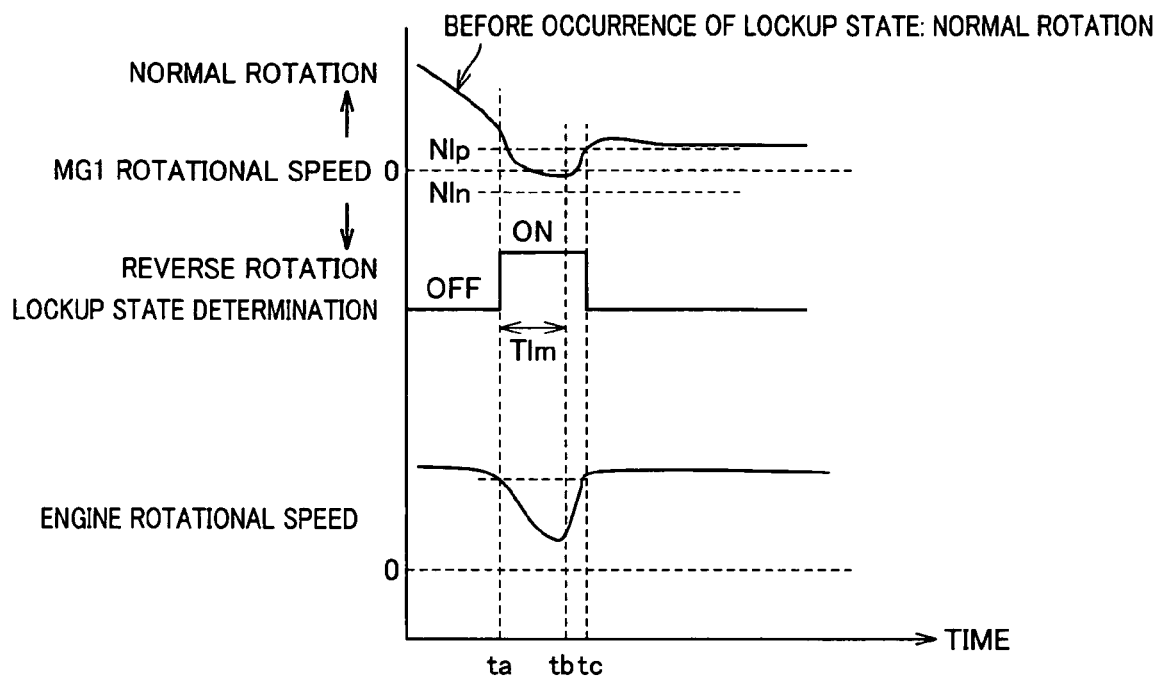
FIG. 11 is an operational waveform chart illustrating a pre-lockup state recovery process.

FIG. 11 is an operational waveform chart illustrating the pre-lockup state recovery process in step S160.

With reference to FIG. 11, the MG1 rotational speed is lower than lockup state determination value Nlp in the normal rotation area at a time ta, so that the lockup state determination flag is set. In response to the fact that the lockup state determination flag is set, the control for pull-out of the lockup state caused due to the decrease of the torque produced by the engine in the first embodiment is started. As a result, the engine rotational speed is reduced, and then the MG1 rotational speed is reduced.

However, in a case where the MG1 rotational speed can not pull out of the lockup area even at a time tb after a lapse of predetermined time Tlm from time ta at which the control for pull-out of the lockup state has started, ECU 30 executes the pre-lockup state recovery process in step S160 (FIG. 10).

In this state, for example, when the torque (absolute value) produced by motor-generator MG1 is decreased, the MG1 rotational speed can be enhanced toward the normal rotation area side in the state shown by line 320 in FIG. 3, that is, the MG1 rotational speed can be changed to the rotational speed before occurrence of the lockup state. Alternatively, the torque produced by the engine is increased relatively in such a manner that the process for decreasing the torque produced by the engine is stopped. As a result, the MG1 rotational speed can be changed to the rotational speed before occurrence of the lockup state as in the aforementioned case even when the MG1 rotational speed is enhanced integrally with the engine rotational speed. Specifically, in step S160, ECU 30 executes at least one of a process for relatively decreasing the torque (absolute value) produced by motor-generator MG1 and a process for relatively increasing the torque produced by the engine in comparison with the period (time ta to time tb) that MG1 lockup state avoiding unit 420 decreases the torque produced by the engine.

As a result, the MG1 rotational speed and the engine rotational speed are enhanced after a lapse of time tb. Thus, motor-generator MG1 can pull out of the lockup state at a time tc.

As described above, according to the control for pull-out of the lockup state in the modification of the first embodiment, even when the control for pull-out of the lockup state in the first embodiment, in which motor-generator MG1 is shifted from the normal rotation area to the reverse rotation area, fails to cause motor-generator MG1 to pull out of the lockup state, the MG1 rotational speed can pull out of the lockup area at the normal rotation area side. As a result, components such as the motor-generator and the inverter can be protected with certainty.

Second Embodiment

In a second embodiment, description will be given of a control configuration capable of increasing the torque (absolute value) produced by motor-generator MG1 in the lockup state, thereby causing motor-generator MG1 to pull out of the lockup state.

Figure 12:
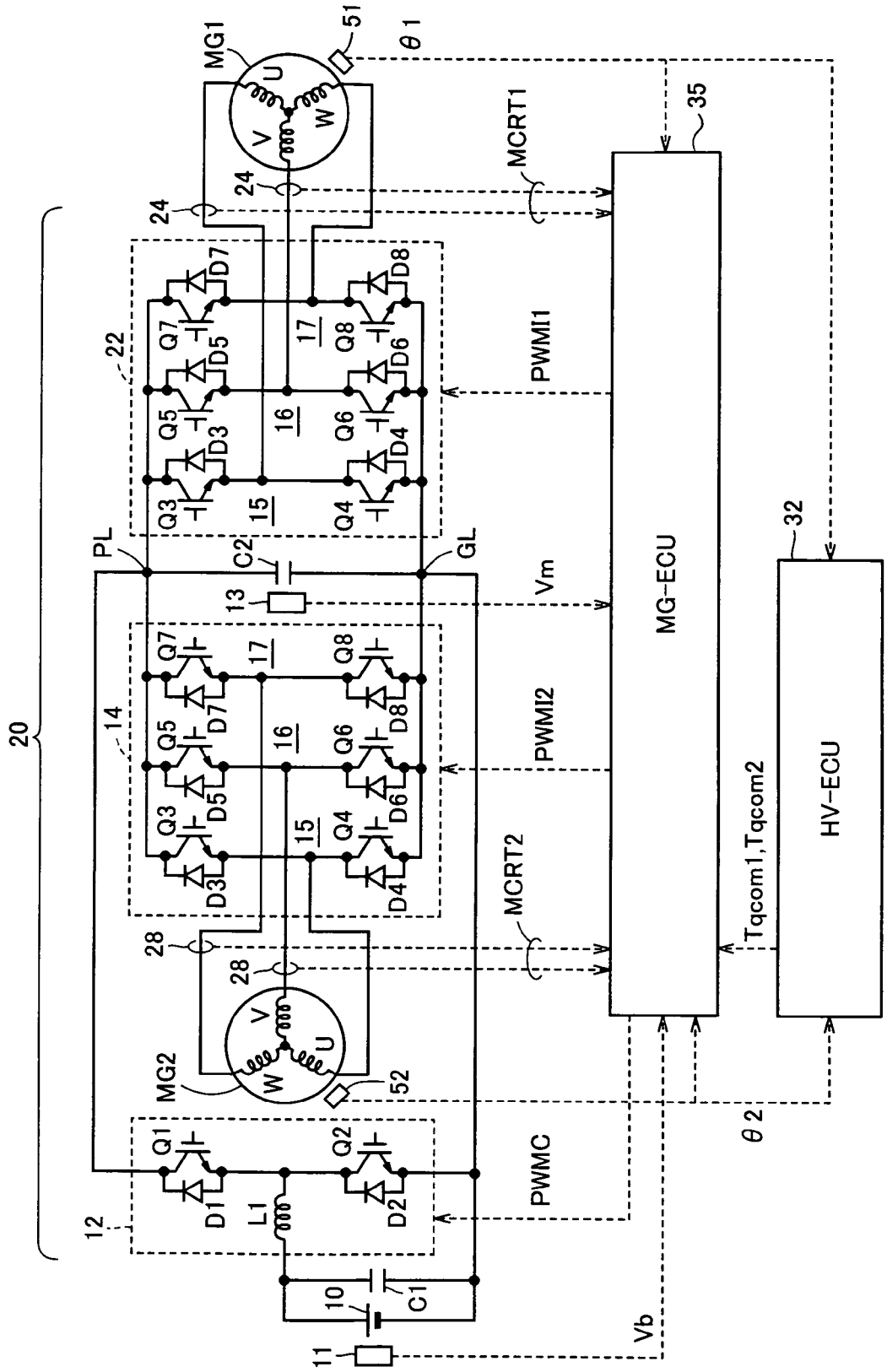
FIG. 12 is a schematic block diagram showing control configurations of motor-generators MG1 and MG2.

FIG. 12 is a schematic block diagram showing control configurations of motor-generators MG1 and MG2.

With reference to FIG. 12, PCU 20 includes capacitors C1 and C2, converter 12, inverters 14 and 22, and current sensors 24 and 28.

ECU 30 shown in FIG. 2 includes an HV-ECU 32 and an MG-ECU 35. Herein, HV-ECU 32 generates torque command values Tqcom1 and Tqcom2 as operation command values for motor-generators MG1 and MG2, and also generates a voltage command value VHref as an operation command value for converter 12. MG-ECU 35 controls converter 12, inverter 14 and inverter 22 such that output voltage VH of converter 12 follows voltage command value VHref and the torques produced by motor-generators MG1 and MG2 follow torque command values Tqcom1 and Tqcom2.

Converter 12 includes a reactor L1, IGBT (Insulated Gate Bipolar Transistor) elements Q1 and Q2, and diodes D1 and D2. Reactor L1 has a first end connected to a power supply line of battery 10, and a second end connected to an intermediate point between IGBT element Q1 and IGBT element Q2, that is, between an emitter of IGBT element Q1 and a collector of IGBT element Q2. IGBT elements Q1 and Q2 are connected in series between power supply line PL and grounding line GL. IGBT element Q1 has a collector connected to the power supply line, and IGBT element Q2 has an emitter connected to the earthing line. Diode D1 is connected between the collector and the emitter of IGBT element Q1 and diode D2 is connected between the collector and the emitter of IGBT element Q2 such that a current flows from each emitter toward each collector.

Inverter 14 includes U-phase upper and lower arms 15, V-phase upper and lower arms 16 and W-phase upper and lower arms 17. U-phase upper and lower arms 15, V-phase upper and lower arms 16 and W-phase upper and lower arms 17 are provided in parallel between the power supply line PL and grounding line GL. U-phase upper and lower arms 15 include IGBT elements Q3 and Q4 connected in series. V-phase upper and lower arms 16 include IGBT elements Q5 and Q6 connected in series. W-phase upper and lower arms 17 include IGBT elements Q7 and Q8 connected in series. A diode D3 is connected between a collector and an emitter of IGBT element Q3, a diode D4 is connected between a collector and an emitter of IGBT element Q4, a diode D5 is connected between a collector and an emitter of IGBT element Q5, a diode D6 is connected between a collector and an emitter of IGBT element Q6, a diode D7 is connected between a collector and an emitter of IGBT element Q7 and a diode D8 is connected between a collector and an emitter of IGBT element Q8 such that a current flows from each emitter toward each collector.

An intermediate point between U-phase upper and lower arms 15 is connected to a U-phase end of a U-phase coil in motor-generator MG2, an intermediate point between V-phase upper and lower arms 16 is connected to a V-phase end of a V-phase coil in motor-generator MG2, and an intermediate point between W-phase upper and lower arms 17 is connected to a W-phase end of a W-phase coil in motor-generator MG2. That is, first ends of the U-, V- and W-phase coils are commonly connected to a neutral point. On the other hand, a second end of the U-phase coil is connected to an intermediate point between IGBT elements Q3 and Q4, a second end of the V-phase coil is connected to an intermediate point between IGBT elements Q5 and Q6, and a second end of the W-phase coil is connected to an intermediate point between IGBT elements Q7 and Q8.

Inverter 22 is equal in configuration to inverter 14.

Voltage sensor 11 detects a DC voltage Vb outputted from battery 10, and outputs detected DC voltage Vb to MG-ECU 35. Capacitor C1 smoothes a DC voltage Vb supplied from battery 10, and supplies smoothed DC voltage Vb to converter 12.

Converter 12 steps up DC voltage Vb supplied from capacitor C1, and then outputs a resultant to capacitor C2. More specifically, converter 12 receives a signal PWMC from MG-ECU 35, steps up DC voltage Vb in accordance with a period that IGBT element Q2 is turned on by signal PWMC, and supplies a resultant to capacitor C2.

Moreover, converter 12 receives signal PWMC from MG-ECU 35, steps down a DC voltage(s) supplied from inverter 14 and/or inverter 22 through capacitor C2, and charges battery 10.

Capacitor C2 smoothes a DC voltage from converter 12, and supplies the smoothed DC voltage to inverters 14 and 22 through power supply line PL and grounding line GL. Voltage sensor 13 detects a voltage across capacitor C2, that is, an output voltage VH of converter 12 (corresponding to input voltages of inverters 14 and 22, the same thing holds true in the following description), and outputs detected output voltage VH to MG-ECU 35.

Upon reception of a DC voltage from capacitor C2, inverter 14 converts the DC voltage to an AC voltage on the basis of a signal PWMI2 from MG-ECU 35 to drive motor-generator MG2. Thus, motor-generator MG2 is driven so as to generate a torque designated by torque command value Tqcom2.

At the time of regenerative braking of hybrid vehicle 5, moreover, inverter 14 converts an AC voltage, which is generated from motor-generator MG2, to a DC voltage on the basis of signal PWMI2 from MG-ECU 35, and supplies the converted DC voltage to converter 12 through capacitor C2. Examples of the regenerative braking mentioned herein include: braking that involves regeneration in such a manner that a driver of a hybrid vehicle presses a foot brake; and deceleration (or stop of acceleration) that involves regeneration in such a manner that the driver does not press the foot brake, but turns off an accelerator pedal when the vehicle runs.

Upon reception of a DC voltage from capacitor C2, inverter 22 converts the DC voltage to an AC voltage on the basis of a signal PWMI1 from MG-ECU 35 to drive motor-generator MG1. Thus, motor-generator MG1 is driven so as to generate a torque designated by torque command value Tqcom1.

Current sensor 24 detects a motor current MCRT1 flowing into motor-generator MG1, and then outputs detected motor current MCRT1 to MG-ECU 35. Current sensor 28 detects a motor current MCRT2 flowing into motor-generator MG2, and then outputs detected motor current MCRT2 to MG-ECU 35.

Further, each of MG-ECU 35 and HV-ECU 32 receives rotor rotation angle θ1 of motor-generator MG1 detected by rotation angle sensor 51 and rotor rotation angle θ2 of motor-generator MG2 detected by rotation angle sensor 52.

MG-ECU 35 receives, from voltage sensor 11, DC voltage Vb outputted from battery 10. MG-ECU 35 also receives motor currents MCRT1 and MCRT2 from current sensors 24 and 28. MG-ECU 35 also receives output voltage VH of converter 12 (i.e., voltage to be inputted to inverters 14 and 22) from voltage sensor 13. MG-ECU 35 also receives rotor rotation angles θ1 and θ2 from rotation angle sensors 51 and 52. MG-ECU 35 also receives, from HV-ECU 32, voltage command value VHref, torque command value Tqcom1 and torque command value Tqcom2 as operation command values.

On the basis of output voltage VH, motor current MCRT2 and torque command value Tqcom2, then, MG-ECU 35 generates a signal PWMI2 used for switching among IGBT elements Q3 to Q8 of inverter 14 when inverter 14 drives motor-generator MG2 by a method to be described later, and then outputs generated signal PWMI2 to inverter 14. On the basis of output voltage VH, motor current MCRT1 and torque command value Tqcom1, moreover, MG-ECU 35 generates a signal PWMI1 used for switching among the IGBT elements of inverter 22 when inverter 22 drives motor-generator MG1 by a method to be described later, and then outputs generated signal PWMI1 to inverter 22.

On the basis of voltage command value VHref, DC voltage Vb and output voltage VH, further, MG-ECU 35 generates a signal PWMC used for switching between IGBT elements Q1 and Q2 of converter 12, and then outputs generated signal PWMC to converter 12.

FIG. 13 schematically illustrates a control mode for each motor-generator.

As shown in FIG. 13, in the second embodiment of the present invention, three control modes are used in a switchable manner with respect to a control of motor-generators MG1 and MG2, that is, an electrical power control in inverters 14 and 22.

A sine wave PWM control is used as a typical PWM control in which each of the U-, V- and W-phase upper and lower arms is turned on/off in accordance with a comparison in voltage between a sine wave-shaped voltage command value and a carrier wave (typically, triangle wave). As a result, a duty ratio with respect to a set of a high-level period corresponding to an ON period of the upper arm element and a low-level period corresponding to an ON period of the lower arm element is controlled such that a basic wave component becomes a sine wave during a period of an electrical angle of 360°. It is well known that the amplitude of the basic wave component can be enhanced only at a level which is about 0.61 times as large as an inverter input voltage in the sine wave PWM control mode.

In a rectangular wave voltage control, on the other hand, a rectangular wave that has a ratio (high-level period:low-level period=1:1) and corresponds to one pulse is applied to an AC motor during the period of the electrical angle of 360°. Thus, a modulation factor is increased up to 0.78.

In an overmodulation PWM control, a PWM control similar to the sine wave PWM control described above is performed in such a manner that the amplitude of the voltage command value becomes distorted. As a result, the basic wave component can be distorted. The modulation factor can be enhanced in a range from the maximum level (about 0.61) up to 0.78 in the sine wave PWM control mode.

In motor-generators MG1 and MG2, when a rotational speed or a produced torque is enhanced or increased, an induced voltage becomes high, so that a required line-to-line voltage (motor-required voltage) becomes high. Output voltage VH from converter 12 must be higher than this motor-required voltage. On the other hand, output voltage VH from converter 12 has a limit value (VH maximum voltage).

In an area where the motor-required voltage is lower than the VH maximum voltage, accordingly, the PWM control mode based on the sine wave PWM control or the overmodulation PWM control is adapted. Then, the torque produced by the motor-generator is controlled on the basis of torque command value Tqcom1 or Tqcom2 in such a manner that the feedback control is performed on a motor current based on a vector control. On the other hand, when the motor-required voltage reaches the VH maximum voltage, the rectangular wave voltage control mode is adapted in such a manner that output voltage VH is set at the VH maximum voltage. Since the amplitude of the basic wave component is fixed by the rectangular wave voltage control, the torque is controlled by the phase control of the rectangular wave voltage pulse on the basis of a deviation between a torque actual value and a torque command value.

FIG. 14 shows a negative torque area in an operating area of motor-generator MG1 shown in FIG. 4 in an enlarged manner.

With reference to FIG. 14, as described above, motor-generator MG1 has a role for controlling the engine rotational speed. For this reason, preferably, motor-generator MG1 produces a high torque over a wide rotational speed area. As shown in FIG. 14, accordingly, part (high-speed rotation area in a range from "+Na" to "+Nxa" or a range from "−Nb" to "−Nxb") of the rotational speed area (in a range from "−Nxb" to "+Nxa") for outputting maximum torque (negative) −Tmax is included in a rectangular wave voltage control mode-adapted area 500. On the other hand, a sine wave PWM control mode-adapted area is provided in an area where the rotational speed is relatively low. An intermediate area 510 provided between rectangular wave voltage control mode-adapted area 500 and sine wave PWM control mode-adapted area 520 is used as an overmodulation PWM control mode-adapted area.

The foregoing design that rectangular wave voltage control mode-adapted area 500 includes the maximum torque (−Tmax upon production of the negative torque) production area has the following merits.

In comparison with the design that the PWM control mode is adapted to each maximum torque production area, the maximum value of required inverter input voltage VH can be lowered. Thus, cost reduction can be achieved by suppression of the requirement about pressure resistance of components. In order to lower the induced voltage of the motor-generator in the high-speed rotation area without adapting the rectangular wave voltage control mode, the number of turns of a coil winding must be increased for increasing rotating magnetic fields generated by the stator of the motor-generator. Therefore, the motor can be reduced in size in such a manner that the rectangular wave voltage control mode is adapted in the high-speed rotation area.

Figure 15:
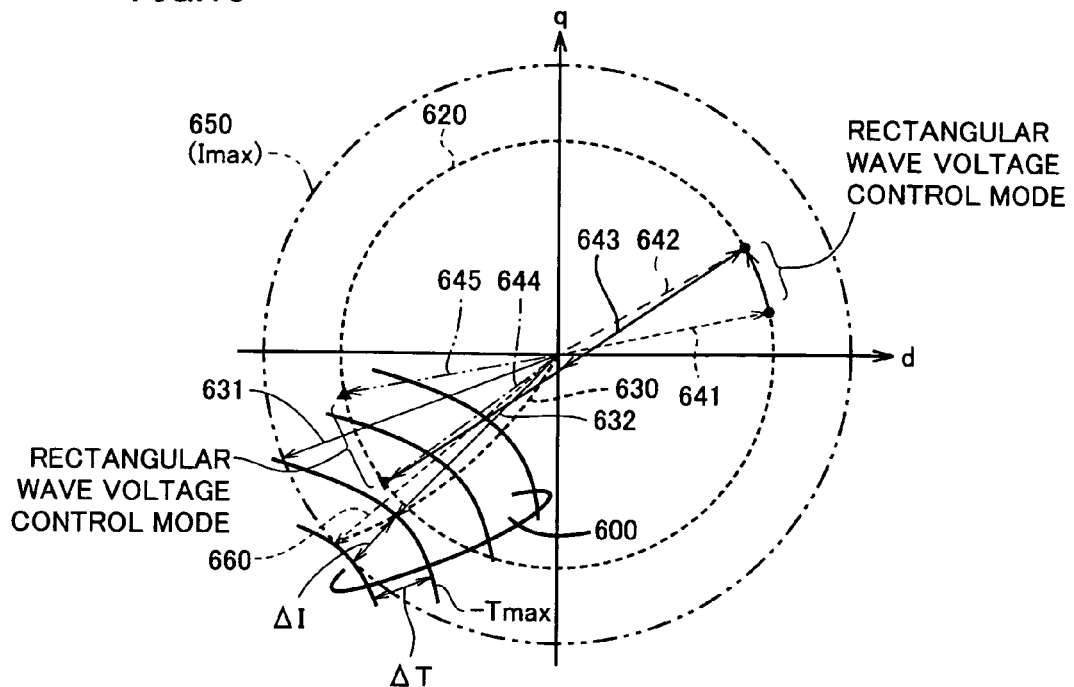
FIG. 15 illustrates a voltage vector and a current vector upon change of a rotational speed of a motor-generator that produces a negative maximum torque.

FIG. 15 illustrates a change in voltage vector and current vector at the time when the rotational speed changes from a starting point (+Nxa) to a terminal point (−Nxb) on a producing line of maximum torque (negative) −Tmax shown in FIG. 14.

With reference to FIG. 15, a fixed torque line 600 represents a locus of a current vector at the time when identical torques are produced. An optimal current line 630 corresponds to a locus of a current vector having a current phase by which motor efficiency becomes maximum on fixed torque line 600. Moreover, a maximum voltage circle 620 represents a locus of a voltage vector of a maximum voltage which can be outputted when inverter 22 drives motor-generator MG1 at the VH maximum voltage.

A voltage vector at the time when the PWM control mode is adapted draws a locus at an inside of maximum voltage circle 620, and a voltage vector at the time when the rectangular wave voltage control mode is adapted draws a locus on maximum voltage circle 620.

When the operating point of motor-generator MG1 is on rotational speed +Nxa at maximum torque −Tmax, the rectangular wave voltage control mode is adapted. Herein, motor-generator MG1 is driven by a voltage represented by a voltage vector 641, and a current represented by a current vector 631 flows in motor-generator MG1.

When the rotational speed changes from "+Nxa" to "+Na", voltage vector 641 is changed to a voltage vector 642 along maximum voltage circle 620. On the other hand, current vector 631 is shifted to a current vector 632 along a fixed torque line of maximum torque −Tmax, on the basis of the change of the voltage vector. During the period when the rotational speed changes from "+Nxa" to "+Na", motor-generator MG1 is driven in the rectangular wave voltage control mode. When the rotational speed reaches "+Na", the control mode is switched to the overmodulation PWM control mode.

When the rotational speed changes from "+Na" to "−Nb" via the lockup state (MG1 rotational speed≅0), voltage vector 642 is shifted to a voltage vector 644 along a voltage vector locus 643, on the basis of the change of the rotational speed. During the period when the rotational speed changes from "+Na" to "−Nb", the current feedback control is performed so that the current vector is fixed to current vector 632. Herein, the overmodulation PWM control mode is switched to sine wave PWM control mode. Then, the sine wave PWM control mode is switched to the overmodulation PWM control mode.

When the rotational speed reaches "−Nb", the overmodulation PWM control mode is switched to the rectangular wave voltage control mode.

Further, when the rotational speed changes from "−Nb" to "−Nxb", voltage vector 644 is changed to a voltage vector 645 along maximum voltage circle 620. Moreover, current vector 632 is shifted to current vector 631 along the torque current line such as maximum torque −Tmax.

A maximum rated current Imax of inverter 22 for driving motor-generator MG1 must be not less than current vector 631. Therefore, an equal current circle 650 represents a minimum value of maximum rated current Imax.

In the lockup state where the motor-generator is driven in the sine wave PWM control mode (MG1 rotational speed≅0), accordingly, an excess amount ΔI up to maximum rated current Imax is generated. In the lockup state, more specifically, motor-generator MG1 is driven at current vector 660 to produce a torque having an absolute value exceeding that of maximum torque −Tmax by a torque allowance ΔT driven by excess amount ΔI. As a result, restriction on the torque to be produced by motor-generator MG1 can be relaxed in comparison with maximum torque −Tmax.

In the lockup state, consequently, the control for pull-out of the lockup state in the second embodiment permits production of a torque (Ttem in FIG. 14) having an absolute value larger than that of maximum torque −Tmax, in such a manner that the restriction on the torque is relaxed temporarily, within a range of a torque restriction relaxation area 550 shown in FIG. 14. Herein, a torque restriction relaxation amount (difference between relaxed restriction torque and maximum torque) in torque restriction relaxation area 550 is determined within a range of torque allowance ΔT increased by excess amount ΔI.

Herein, torque restriction relaxation area 550 is not provided symmetrically between the normal rotation area (rotational speed>0) and the reverse rotation area (rotational speed<0). Preferably, torque restriction relaxation area 550 is provided in such a manner that the absolute value of the produced torque value after relaxation is larger than the single rotational speed (absolute value) in the reverse rotation area rather than the normal rotation area. Thus, motor-generator MG1 can pull out of the lockup state appropriately in light of the fact that the lockup state occurs frequently at the time when the normal rotation and regenerating mode is switched to the reverse rotation and power running mode.

Although not shown in FIG. 14, description for verification will be given of a matter that a torque restriction relaxation area is provided also in the positive torque area.

Figure 16:
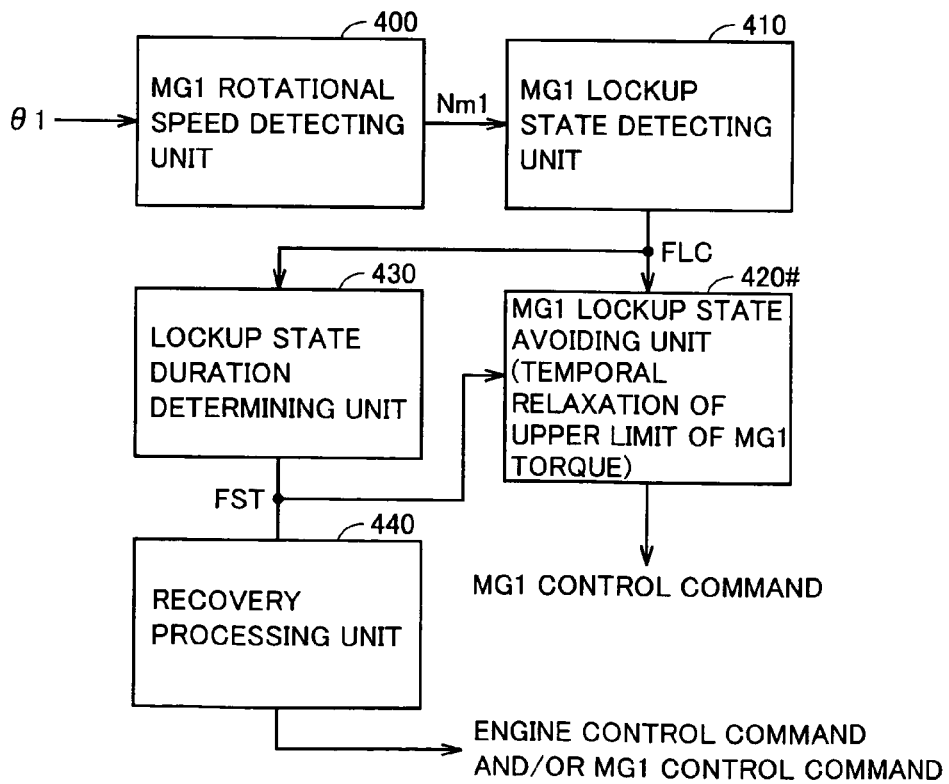
FIG. 16 is a schematic block diagram illustrating a control for pull-out of the lockup state in a second embodiment of the present invention.

FIG. 16 is a schematic block diagram illustrating the control for pull-out of the lockup state in the second embodiment of the present invention.

With reference to FIG. 16, the control for pull-out of the lockup state in the second embodiment is different in control configuration from the control for pull-out of the lockup state in the modification of the first embodiment in FIG. 9. In the control for pull-out of the lockup state in the second embodiment, an MG1 lockup state avoiding unit 420# is provided in place of MG1 lockup state avoiding unit 420.

When lockup state determination flag FLC is set, MG1 lockup state avoiding unit 420# temporarily relaxes the restriction on the torque of motor-generator MG1 within the range of torque restriction relaxation area 550 in FIG. 14, so that motor-generator MG1 can pull out of the lockup state. In the configuration shown in FIG. 16, lockup state duration determining unit 430 determines a duration of the lockup state starting from the temporal relaxation of the restriction on the torque of motor-generator MG1, on the basis of lockup state determination flag FLC. That is, lockup state duration determining unit 430 determines whether a duration that MG1 lockup state avoiding unit 420# relaxes the restriction on the torque of motor-generator MG1 exceeds predetermined time Tlm.

When the lockup state duration exceeds predetermined time Tlm, lockup state duration determining unit 430 sets flag FST. When flag FST is set, MG1 lockup state avoiding unit 420# stops the temporal relaxation of the restriction on the torque produced by motor-generator MG1. Thus, the torque produced by motor-generator MG1 is set within a range where an absolute value thereof is smaller than that of maximum torque −Tmax shown in FIG. 14.

Herein, motor-generator MG1 can not pull out of the lockup state due to the temporal relaxation of the restriction on the torque produced by the motor-generator MG1. Therefore, recovery processing unit 440 executes the pre-lockup state recovery process as in the case of the modification of the first embodiment.

Figure 17:
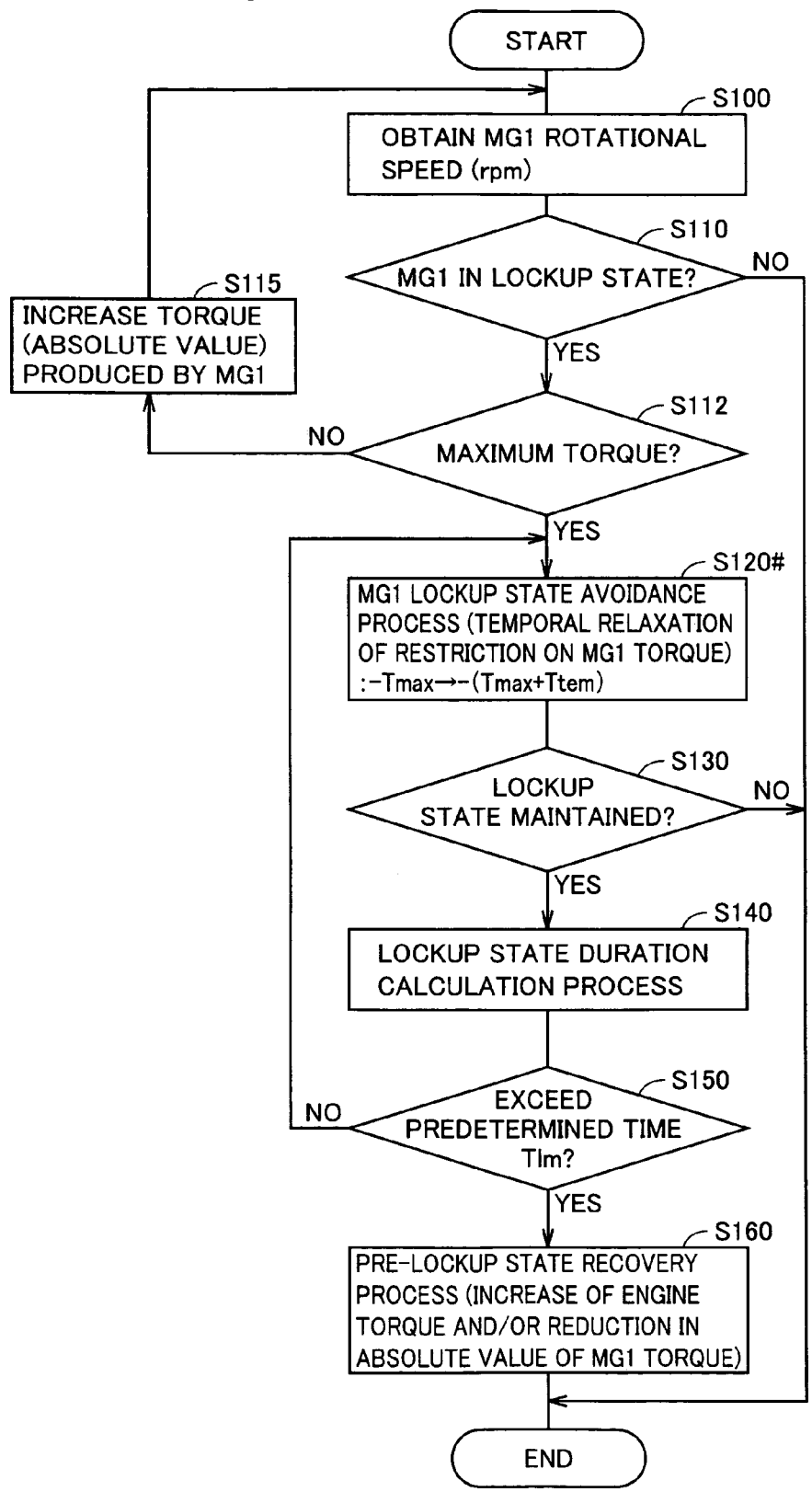
FIG. 17 is a flowchart realizing the control for pull-out of the lockup state in the second embodiment of the present invention.

FIG. 17 is a flowchart illustrating the control for pull-out of the lockup state in the second embodiment.

The flowchart of FIG. 17 is different from that of FIG. 10. That is, as for the control for pull-out of the lockup state in the second embodiment in FIG. 17, a process in step S120# is executed in place of the process in step S120 shown in FIG. 10.

In step S120#, ECU 30 temporarily relaxes the restriction on the torque produced by motor-generator MG1. That is, the process in step S120# corresponds to the function of MG1 lockup state avoiding unit 420# in FIG. 16. Thus, motor-generator MG1 can pull out of the lockup state in such a manner that the restriction on the torque produced by motor-generator MG1 is temporarily relaxed within the range of torque restriction relaxation area 550 shown in FIG. 14.

Remaining steps S100 to S115 and S130 to S160 are similar to those in the modification of the first embodiment; therefore, repetitive description thereof will not be given here. In step S160, particularly, ECU 30 executes a process for stopping the temporal relaxation of the restriction on the torque produced by motor-generator MG1 and a process for changing the MG1 rotational speed to the rotational speed before occurrence of the lockup state.

In the control for pull-out of the lockup state in the second embodiment, as described above, the restriction on the torque produced by motor-generator MG1 is temporarily relaxed in the lockup state where the PWM control mode is adapted, under conditions that the rectangular wave voltage control mode is adapted to part of the maximum torque production area. Thus, motor-generator MG1 can pull out of the lockup state.

In the case where the lockup state is still maintained even when the process for temporarily relaxing the restriction on the torque produced by motor-generator MG1 is maintained after a lapse of predetermined restriction time Tlm, there is a possibility that motor-generator MG1 and inverter 22 are overheated. Therefore, the relaxation of the restriction on the torque is stopped. As in the case of the modification of the first embodiment, further, motor-generator MG1 can pull out of the lockup state in such a manner that the MG1 rotational speed is changed to the rotational speed before occurrence of the lockup state. As a result, components such as a motor-generator and an inverter can be protected with certainty.

It is to be noted that the control for pull-out of the lockup state in the second embodiment can be adapted to not only the case where motor-generator MG1 enters the lockup state at the time of producing the negative maximum torque, but also the case where motor-generator MG1 enters the lockup state at the time of producing the positive maximum torque.

Moreover, the control for pull-out of the lockup state in the second embodiment may be combined with the control for pull-out of the lockup state in the first embodiment or that in the modification of the first embodiment, such that the increase of the torque (absolute value) produced by motor-generator MG1 in step S115 shown in FIG. 7 or 10 is permitted up to a range described in step S120# in FIG. 17, that is, within the range of torque restriction relaxation area 550 shown in FIG. 14.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device for a hybrid vehicle including an engine actuated by combustion of fuel, a power split device coupling a plurality of rotating elements, coupled to a transmitting shaft of said engine, a transmitting shaft of a first motor-generator and a transmitting member, respectively, to one another in a relatively rotatable manner, and transmitting at least part of power from said engine to said transmitting member by transmission/reception of electrical power and mechanical power to/from said first motor-generator, a second motor-generator supplying mechanical power at a position between said transmitting member and a drive wheel, and a power control unit connected to an electric storage device, said first motor-generator and said second motor-generator to perform bi-directional electrical power control, said control device comprising:
a rotational speed detecting unit detecting a rotational speed of said first motor-generator;
a lockup state detecting unit detecting a lockup state of said first motor-generator on the basis of the rotational speed of said first motor-generator; and
a lockup state avoidance controlling unit decreasing a torque produced by said engine upon detection of said lockup state.

2. The control device according to claim 1, wherein
upon detection of said lockup state, said lockup state avoidance controlling unit decreases the torque produced by said engine when a torque produced by said first motor-generator reaches a maximum torque value, and increases the torque produced by said first motor-generator when the torque produced by said first motor-generator has an allowance with respect to said maximum torque value.

3. The control device according to claim 1, further comprising:
a lockup state duration determining unit determining whether said lockup state is still maintained after a lapse of a predetermined time during a period that said lockup state avoidance controlling unit decreases the torque produced by said engine; and
a recovery processing unit changing the rotational speed of said first motor-generator to a rotational speed before occurrence of said lockup state when said lockup state is still maintained after the lapse of said predetermined time.

4. The control device according to claim 3, wherein
said recovery processing unit executes at least one of a process for relatively increasing the torque produced by said engine and a process for relatively reducing an absolute value of the torque produced by said first motor-generator, in comparison with the period that said lockup state avoidance controlling unit decreases the torque produced by said engine.

5. The control device according to claim 1, wherein
said power split device includes a planetary gear mechanism having, as said plurality of rotating elements, a carrier to which the transmitting shaft of said engine is coupled, a ring gear to which said transmitting member is coupled, and a sun gear to which the transmitting shaft of said first motor-generator is coupled.

6. A control method for a hybrid vehicle including an engine actuated by combustion of fuel, a power split device coupling a plurality of rotating elements, coupled to a transmitting shaft of said engine, a transmitting shaft of a first motor-generator and a transmitting member, respectively, to one another in a relatively rotatable manner, and transmitting at least part of power from said engine to said transmitting member by transmission/reception of electrical power and mechanical power to/from said first motor-generator, a second motor-generator supplying mechanical power at a position between said transmitting member and a drive wheel, and a power control unit connected to an electric storage device, said first motor-generator and said second motor-generator to perform bi-directional electrical power control, said control method comprising the steps of:
detecting a rotational speed of said first motor-generator;
detecting a lockup state of said first motor-generator on the basis of the rotational speed of said first motor-generator; and
decreasing a torque produced by said engine upon detection of said lockup state.

7. The control method according to claim 6, further comprising the step of:
increasing a torque produced by said first motor-generator without decreasing the torque produced by said engine, in a case where the torque produced by said first motor-generator has an allowance with respect to a maximum torque.

8. The control method according to claim 6, further comprising the steps of:
determining whether said lockup state is still maintained after a lapse of a predetermined time during a period that the torque produced by said engine is decreased in said step of decreasing; and
executing a recovery process for changing the rotational speed of said first motor-generator to a rotational speed before occurrence of said lockup state when said lockup state is still maintained after the lapse of said predetermined time.

9. The control method according to claim 8, wherein
said step of executing recovery process executes at least one of a process for relatively increasing the torque produced by said engine and a process for relatively reducing an absolute value of the torque produced by said first motor-generator in comparison with the period that the torque produced by said engine is decreased in said step of decreasing.

10. The control method according to claim 6, wherein
said power split device includes a planetary gear mechanism having, as said plurality of rotating elements, a carrier to which the transmitting shaft of said engine is coupled, a ring gear to which said transmitting member is coupled, and a sun gear to which the transmitting shaft of said first motor-generator is coupled.

* * * * *